US009689752B2

(12) United States Patent
Mori

(10) Patent No.: US 9,689,752 B2
(45) Date of Patent: Jun. 27, 2017

(54) OFDR DEVICE AND OFDR METHOD

(71) Applicant: ANRITSU CORPORATION, Kanagawa (JP)

(72) Inventor: Takashi Mori, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/042,616

(22) Filed: Feb. 12, 2016

(65) Prior Publication Data

US 2016/0245643 A1 Aug. 25, 2016

(30) Foreign Application Priority Data

Feb. 20, 2015 (JP) ................................ 2015-032227

(51) Int. Cl.
*G01K 11/32* (2006.01)
*G01D 5/353* (2006.01)
(Continued)

(52) U.S. Cl.
CPC .............. *G01K 11/32* (2013.01); *G01B 11/18* (2013.01); *G01D 5/35316* (2013.01);
(Continued)

(58) Field of Classification Search
CPC .. G01M 11/30; G01M 11/31; G01M 11/3172; G01B 11/16; G01B 11/161; G01B 11/165; G01B 11/18; G01D 5/268; G01D 5/353; G01D 5/35316; G01D 5/3537; G01D 5/35374; G01D 5/35377; G01D 5/3538; G01D 5/35387; G01D 5/3539; G01D 5/35393; G01D 5/35396; G01K 11/32; G01K 11/3206

See application file for complete search history.

(56) References Cited

U.S. PATENT DOCUMENTS 5,945,666 A * 8/1999 Kersey .................. G01B 11/18
250/227.14
6,448,551 B1 * 9/2002 Kersey ............... G01D 5/35316
250/227.14
(Continued)

FOREIGN PATENT DOCUMENTS

JP 2005-147900 A 9/2005

*Primary Examiner* — Gordon J Stock, Jr.
(74) *Attorney, Agent, or Firm* — Pearne & Gordon LLP

(57) ABSTRACT

To provide an OFDR device and an OFDR method capable of measuring a large strain distribution or a large temperature distribution within a narrow measured wavelength range by using an FBG. A measured optical fiber 13 includes a plurality of gratings that is overlappingly formed in order to reflect a plurality of different wavelengths. An OFDR device 1 measures a strain distribution or a temperature distribution of the measured optical fiber 13 on the basis of the result of detection by a measuring range non-inclusion detector 26 that detects gratings of the plurality of gratings of which the reflected wavelengths are not included in the measured wavelength range from the peak wavelengths detected by a peak wavelength detector on the basis of measured wavelength range non-inclusion detecting condition data (Ds) in which a predetermined measured wavelength range is set in the direction of the axis of the peak wavelengths.

20 Claims, 17 Drawing Sheets

(51) Int. Cl.
*G01B 11/16* (2006.01)
*G01M 11/00* (2006.01)

(52) U.S. Cl.
CPC ..... *G01D 5/35387* (2013.01); *G01K 11/3206* (2013.01); *G01M 11/3172* (2013.01)

(56) References Cited

U.S. PATENT DOCUMENTS

| | | | | |
|---|---|---|---|---|
| 6,597,822 | B1* | 7/2003 | Moslehi | G01B 11/16 250/227.14 |
| 9,267,854 | B2* | 2/2016 | Asokan | G01K 11/3206 |
| 2007/0053626 | A1* | 3/2007 | Takei | G01B 11/18 385/13 |
| 2010/0103426 | A1* | 4/2010 | Kim | G01J 3/02 356/446 |
| 2011/0317148 | A1* | 12/2011 | Froggatt | G01B 11/161 356/35.5 |
| 2012/0086934 | A1* | 4/2012 | Digonnet | G01D 5/35316 356/32 |
| 2014/0375980 | A1* | 12/2014 | Chin | G01D 5/35316 356/32 |
| 2016/0239464 | A1* | 8/2016 | Bessler | G06F 17/17 |

* cited by examiner

OFDR DEVICE AND OFDR METHOD

TECHNICAL FIELD

The present invention relates to an OFDR device and an OFDR method and particularly to an OFDR device and an OFDR method that measure a strain distribution or a temperature distribution of a measured optical fiber which includes a plurality of overlapping fiber Bragg gratings (FBG) having different reflected wavelengths, by using a light source that sweeps a predetermined wavelength range.

BACKGROUND ART

In the related art, there is known an OFDR device that measures a strain distribution or a temperature distribution of an optical fiber by using optical frequency domain reflectometry (OFDR) (for example, refer to Patent Document 1). The strain distribution and the temperature distribution of an optical fiber can be measured in the same manner. Thus, hereinafter, a configuration and operation of the OFDR device will be described in strain measurement as an example.

FIG. 15 illustrates a basic configuration of the OFDR device of the related art. A swept light source 41 sweeps the wavelength of output light such that the frequency of light linearly changes with respect to time. An optical coupler 42 causes the output light of the swept light source 41 to branch into two. One branch of the light branching at the optical coupler 42 is incident on a measured optical fiber 43, and the other is incident on a reference light optical fiber 44.

The measured optical fiber 43 includes fiber Bragg gratings (FBG) 431, 432, and 433 of a predetermined length. The FBGs may be arranged in plural quantities discretely as in FIG. 15, or there may be only one FBG.

The FBGs, when being arranged in plural quantities, may have different grating periods or may have the same grating period. The FBGs reflect light of a specific wavelength corresponding to the grating period thereof. The wavelength of the reflected light changes if a longitudinal strain is exerted on the measured optical fiber 43.

A reflecting coat (reflecting face) 44a that reflects light of all wavelengths is attached to the tip end of the reference light optical fiber 44. Light reflected by the measured optical fiber 43 and light (reference light) reflected by the reflecting face 44a of the reference light optical fiber 44 are combined by the optical coupler 42, and the reflected light from the measured optical fiber 43 interferes with the reference light. An optical receiver 46 outputs an electrical signal in proportion to the intensity of input light and outputs a beat signal from the interference of the reference light and the reflected light from the measured optical fiber 43. The electrical signal is converted into a digital signal by an A/D converter 47.

A spectrogram calculator 48 performs discrete Fourier-transform on the digital signal in each differential wavelength interval and calculates a spectrogram. A peak wavelength detector 49 detects the peak of the spectrogram in the direction of a wavelength axis in each differential frequency interval and outputs a strain at each position on the measured optical fiber 43. A feature of the present method is that a strain distribution in an FBG of a predetermined length can be measured since the strain is obtained in each differential frequency interval.

An FBG is configured of a grating that is formed by periodically changing a refractive index in the longitudinal direction of the optical fiber. Given that the grating period of the FBG is $\Lambda$, a reflected wavelength $\lambda_0$ when there is no strain is represented as follows.

$$\lambda_0 = 2n\Lambda \qquad (1)$$

The symbol n is the refractive index of the measured optical fiber. A reflected wavelength change $\Delta\lambda$ when a strain $\epsilon$ is exerted on the measured optical fiber in the longitudinal direction thereof is represented as follows.

$$\lambda_0 + \Delta\lambda = 2(n+\Delta n)(\Lambda+\Delta\Lambda) \qquad (2)$$

The symbol $\Delta n$ is a refractive index change when the strain $\epsilon$ is exerted, and the symbol $\Delta\Lambda$ is a grating period change when the strain $\epsilon$ is exerted. Generally, $\Delta n$ and $\Delta\Lambda$ are sufficiently smaller than n and $\Lambda$ respectively. Thus, the following expression can be achieved.

$$\frac{\Delta\lambda}{\lambda 0} \simeq \frac{\Delta n}{n} + \frac{\Delta\Lambda}{\Lambda} \simeq \frac{\Delta n}{n} + \varepsilon \qquad (3)$$

In a case of n=1.45 and $\lambda_0$=1550 nm, $\Delta\lambda \approx 1.2 \times 10^{-6} \cdot \epsilon$ is satisfied, and measuring the reflected wavelength change $\Delta\lambda$ allows the strain $\epsilon$ of the measured optical fiber to be obtained.

The measured optical fiber 43 is assumed to have three reflection points of a point a, a point b, and a point c as illustrated in FIG. 16(a), and the distances thereof from a near end point o of the measured optical fiber 43 are designated by reference signs $L_a$, $L_b$, and $L_c$. If the distance of light from the optical coupler 42 reflected at the near end point o of the measured optical fiber 43 and returning to the optical coupler 42 is the same as the distance of the reference light from the optical coupler 42 reflected by the reflecting face 44a of the reference light optical fiber 44 and returning to the optical coupler 42, light reflected at the point a of the measured optical fiber 43 is combined by the optical coupler 42 with a time delay of $t_a = 2nL_a/c$ in comparison with the reference light. In the time delay, the symbol n is the refractive index of the measured optical fiber 43, and the symbol c is the speed of light.

Similarly, light reflected at the point b and light reflected at the point c are respectively delayed in time by $t_b = 2nL_b/c$ and $t_c = 2nL_c/c$. An optical frequency $v_r$ of the reference light, an optical frequency $v_a$ of the reflected light from the point a, an optical frequency $v_b$ of the reflected light from the point b, and an optical frequency $v_c$ of the reflected light from the point c are illustrated in FIG. 16(b).

Given that an optical frequency change per unit time in the output light of the swept light source 41 is S, a beat frequency from the interference of the reference light and the reflected light from the point a is represented as follows.

$$f_a = |v_a - v_r| = S \cdot t_a = \frac{2nS}{c}L_a \qquad (4)$$

Similarly, beat frequencies from the interference of the reference light with the reflected light from the point b and with the reflected light from the point c are represented as follows.

$$f_b = |v_b - v_r| = S \cdot t_b = \frac{2nS}{c}L_b \qquad (5)$$

-continued $$f_c = |v_c - v_r| = S \cdot t_c = \frac{2nS}{c}L_c \qquad (6)$$

Accordingly, if a received signal is Fourier-transformed, beat signals of frequencies $f_a$, $f_b$, and $f_c$ are observed in proportion to the distances $L_a$, $L_b$, and $L_c$ as in FIG. 16(c). A reflectance is assumed to be sufficiently small at each point, and multiple reflections are ignored. As described heretofore, a longitudinal distribution of reflection from the measured optical fiber can be measured by optical frequency domain reflectometry.

The spectrogram is obtained by performing short-time Fourier transform for each predetermined amount of time and represents intensities of light with color and shade on a two-dimensional plane formed by a time axis and a frequency axis. In each discrete Fourier transform, a window function is applied if necessary to make an overlap generally in a time domain. Since the output light of the swept light source 41 is wavelength-swept, the time axis is convertible into wavelength, and wavelength is convertible into strain from the above relationship. In addition, since the beat frequency corresponds to a distance on the measured optical fiber 43 as described above, the frequency axis is convertible into distance.

Accordingly, intensity data is obtained on a two-dimensional plane having a horizontal axis as distance and a vertical axis as strain. The spectrogram of a beat signal when a strain is not exerted on the measured optical fiber 43 is illustrated in FIG. 17(a). In FIG. 17, black represents low intensity, and white represents high intensity. The spectrogram, for example, if a strain is exerted on the measured optical fiber 43 is illustrated in FIG. 17(b). If the peak of the spectrogram is obtained in the direction of the wavelength axis, a strain distribution in the FBG of the measured optical fiber 43 is obtained as in FIG. 17(c) when a strain is not exerted and as in FIG. 17(d), for example, when a strain is exerted.

A relationship between the strain of the measured optical fiber 43 and the peak wavelength of the reflected light is illustrated in FIG. 18. Given that a relationship between the reflected wavelength change $\Delta\lambda$ and the strain $\epsilon$ is $\Delta\lambda = a \cdot \epsilon$ and that a measured wavelength range is $\Delta\lambda_m$, a strain measurable range $\Delta\epsilon$ is represented as follows.

$$\Delta\varepsilon = \frac{\Delta\lambda m}{a} \qquad (7)$$

For example, in a case of $a=1.2\times10^{-6}$, a strain range of $\Delta\epsilon=0.08\%$ can be measured within a measured wavelength range of $\Delta\lambda_m=1$ nm.

RELATED ART DOCUMENT

Patent Document

[Patent Document 1] Japanese Unexamined Patent Application Publication No. 2005-147900

DISCLOSURE OF THE INVENTION

Problem that the Invention is to Solve

As described above, the reflected wavelength of the FBG is changed by a longitudinal strain exerted on the measured optical fiber. Thus, in the OFDR method of the related art as disclosed in Patent Document 1, the measured wavelength range is required to be set to be greater than or equal to the range of the reflected wavelength change of the FBG. Accordingly, if the strain is large, the range of the reflected wavelength change of the FBG is increased, and thus, the measured wavelength range is required to be increased, and the range of the swept wavelength of a laser (swept light source) is required to be set to be greater than the measured wavelength range. Therefore, measuring a large strain requires increasing the range of the swept wavelength of the swept light source. However, generally, a problem arises in that it is difficult to increase the range of the swept wavelength of the swept light source.

In addition, since a laser has a constant swept frequency, increasing the swept wavelength range increases a wavelength sweep speed (wavelength change per unit time) and increases the frequency of the beat signal. Thus, a high-speed optical receiver and a high-speed A/D converter are required, thereby posing the problem of a cost increase.

Regarding this point, increasing the swept wavelength range without increasing the wavelength sweep speed requires decreasing the swept frequency, thereby posing the problem in that a strain measuring rate is decreased.

In addition, the frequency of the beat signal increases if a measured distance range increases. Thus, a high-speed optical receiver and a high-speed A/D converter are required, thereby posing the problem of a cost increase.

Decreasing the beat frequency requires decreasing the wavelength sweep speed. However, if the swept frequency is decreased, a problem arises in that the strain measuring rate is decreased. In addition, decreasing the wavelength sweep speed without decreasing the swept frequency requires decreasing the swept wavelength range, thereby posing the problem in that a large strain cannot be measured.

The present invention is conceived to resolve such problems of the related art, and an object thereof is to provide an OFDR device and an OFDR method capable of measuring a large strain distribution or a large temperature distribution within a narrow measured wavelength range by using an FBG.

Means for Solving the Problem

In order to resolve the problem, according to a first aspect of the present invention, there is provided an OFDR device that measures a strain distribution or a temperature distribution of a measured optical fiber, the device including a light source that outputs wavelength-swept light, a measured optical fiber that includes a fiber Bragg grating unit, an optical splitter/combiner that inputs part of output light from the light source to the measured optical fiber and combines reflected light from the measured optical fiber and part of output light from the light source, an optical receiver that converts light from the optical splitter/combiner into an electrical signal, an A/D converter that converts the electrical signal into a digital signal, a spectrogram calculator that calculates a spectrogram by performing discrete Fourier transform on the digital signal, and a peak wavelength detector that detects a peak wavelength of the spectrogram on a wavelength axis, in which the fiber Bragg grating unit includes a plurality of gratings that is overlappingly formed in order to reflect a plurality of different wavelengths, the OFDR device further includes a measuring range non-inclusion detector that detects gratings of the plurality of gratings of which the reflected wavelengths are not included in the measured wavelength range from the peak wavelengths detected by the peak wavelength detector on the basis of measured wavelength range non-inclusion detecting condition data (Ds) in which a predetermined measured wavelength range is set in the direction of the wavelength axis of the peak wavelengths, and a strain distribution or a temperature distribution of the measured optical fiber is measured on the basis of results from the measuring range non-inclusion detector and the peak wavelengths detected by the peak wavelength detector.

In the OFDR device, according to a second aspect of the present invention, the measured wavelength range non-inclusion detecting condition data (Ds) is set on the basis of a peak wavelength change in the plurality of gratings with respect to a strain or temperature change in the measured optical fiber and of a strain or temperature change ranges that are formed in plural quantities in the direction of a strain or temperature change axis by dividing a strain or temperature change measurable range and are defined by the measured wavelength range and the peak wavelength change in the plurality of gratings, the measuring range non-inclusion detector detects a strain or temperature change range of the plurality of strain or temperature change ranges that includes a strain or temperature of the measured optical fiber from the peak wavelengths detected by the peak wavelength detector on the basis of the measured wavelength range non-inclusion detecting condition data (Ds), and a strain distribution or a temperature distribution of the measured optical fiber is measured on the basis of the strain or temperature change range detected by the measuring range non-inclusion detector and the peak wavelengths detected by the peak wavelength detector.

According to a third aspect of the present invention, the OFDR device further includes a peak wavelength corrector that determines, when the measuring range non-inclusion detector detects a reflected wavelength of at least one grating of the fiber Bragg grating unit not being included in the measured wavelength range, whether a measurement processing wavelength which is preset to detect a strain or temperature change is included in the peak wavelengths of the gratings of the fiber Bragg grating unit within the measured wavelength range and, if the measurement processing wavelength is not included in the peak wavelengths of the gratings of the fiber Bragg grating unit within the measured wavelength range, converts one or more the peak wavelengths of the gratings of the fiber Bragg grating unit within the measured wavelength range into the measurement processing wavelength and outputs the measurement processing wavelength.

In the OFDR device, according to a fourth aspect of the present invention, the fiber Bragg grating unit of the measured optical fiber includes two gratings that are overlappingly formed, a space between reflected wavelengths of the two gratings being set to ½ or less of the measured wavelength range, and the measuring range non-inclusion detector detects the number of peak wavelengths detected by the peak wavelength detector, determines that the reflected wavelengths of the two gratings are included in the measured wavelength range if the number of peak wavelengths detected is two, determines that the reflected wavelength of the long wavelength side grating is not included in the measured wavelength range if there is one detected peak wavelength that is on a long wavelength side from the middle of the measured wavelength range, and determines that the reflected wavelength of the short wavelength side grating is not included in the measured wavelength range if there is one detected peak wavelength that is on a short wavelength side from the middle of the measured wavelength range.

In the OFDR device, according to a fifth aspect of the present invention, the fiber Bragg grating unit of the measured optical fiber includes two gratings that are overlappingly formed, a space between reflected wavelengths of the two gratings being set to ½ or less of the measured wavelength range, and the measuring range non-inclusion detector detects the number of peak wavelengths detected by the peak wavelength detector, determines that the reflected wavelengths of the two gratings are included in the measured wavelength range if the number of peak wavelengths detected is two, determines that the reflected wavelength of the long wavelength side grating is not included in the measured wavelength range if there is one detected peak wavelength that is on a long wavelength side from the middle of the measured wavelength range, and determines that the reflected wavelength of the short wavelength side grating is not included in the measured wavelength range if there is one detected peak wavelength that is on a short wavelength side from the middle of the measured wavelength range.

In the OFDR device, according to a sixth aspect of the present invention, the fiber Bragg grating unit of the measured optical fiber includes three or more gratings that are overlappingly formed, spaces between adjacent reflected wavelengths of the three or more gratings being set to different values, and the measuring range non-inclusion detector estimates gratings of the three or more gratings of which the reflected wavelengths are not included in the measured wavelength range on the basis of one or more spaces between the peak wavelengths detected by the peak wavelength detector.

In the OFDR device, according to a seventh aspect of the present invention, the fiber Bragg grating unit of the measured optical fiber includes two or more gratings that are overlappingly formed, reflectances of the two or more gratings being set to different values, and the measuring range non-inclusion detector estimates gratings of the two or more gratings of which the reflected wavelengths are not included in the measured wavelength range on the basis of one or more intensities of the peak wavelength detected by the peak wavelength detector.

In the OFDR device, according to an eighth aspect of the present invention, the fiber Bragg grating unit of the measured optical fiber includes n (n≥3) gratings that are overlappingly formed, spaces between adjacent reflected wavelengths of the n gratings being set to different values, a difference between a longest reflected wavelength and a shortest reflected wavelength of the reflected wavelengths being set to (n−1)/2 times the measured wavelength range or less, the peak wavelength detector detects peak wavelengths of two gratings of the n gratings, and the measuring range non-inclusion detector estimates gratings of the n gratings of which the reflected wavelengths are not included in the measured wavelength range on the basis of a space between the two peak wavelengths detected.

In the OFDR device, according to a ninth aspect of the present invention, the fiber Bragg grating unit of the measured optical fiber includes n (n≥2) gratings that are overlappingly formed, reflectances of the n gratings being set to different values, a difference between a longest reflected wavelength and a shortest reflected wavelength of reflected wavelengths of the n gratings being set to (n−1) times the measured wavelength range or less, the peak wavelength detector detects a peak wavelength of one grating of the n gratings, and the measuring range non-inclusion detector estimates gratings of the n gratings of which the reflected wavelengths are not included in the measured wavelength range on the basis of the intensity of the peak wavelength detected.

In the OFDR device, according to a tenth aspect of the present invention, the fiber Bragg grating unit of the measured optical fiber includes n (n≥3) gratings that are overlappingly formed, reflectance differences between gratings of the n gratings of which the reflected wavelengths are adjacent being set to different values, a difference between a longest reflected wavelength and a shortest reflected wavelength of reflected wavelengths of the n gratings being set to (n−1)/2 times the measured wavelength range or less, the peak wavelength detector detects peak wavelengths of two gratings of the n gratings, and the measuring range non-inclusion detector estimates gratings of the n gratings of which the reflected wavelength are not included in the measured wavelength range on the basis of an intensity difference between the two peak wavelengths detected.

In the OFDR device, according to an eleventh aspect of the present invention, the reflected wavelengths of (m+1) (m is an integer, m≥2) or more of the gratings are respectively set to wavelengths that are either not shifted or shifted by $\Delta\lambda_1$ with respect to equidistant wavelengths of a wavelength space $\Delta\lambda_s$, selection of whether not to shift or to shift by $\Delta\lambda_1$ being made in accordance with an m-stage pseudorandom binary sequence, the peak wavelength detector detects at least m peak wavelengths, and the measuring range non-inclusion detector detects a pattern of at least m bits by discriminating whether spaces between the adjacent peak wavelengths are $\Delta\lambda_s$, $\Delta\lambda_s+\Delta\lambda_1$, or $\Delta\lambda_s-\Delta\lambda_1$ and estimates gratings of the (m+1) or more gratings of which the reflected wavelengths are not included in the measured wavelength range by obtaining a phase of the pseudorandom binary sequence from the pattern of at least m bits.

In the OFDR device, according to a twelfth aspect of the present invention, each space between the adjacent reflected wavelengths of (m+2) (m is an integer, m≥2) or more of the gratings is set to either $\Delta\lambda_0$ or $\Delta\lambda_1$, selection of the $\Delta\lambda_0$ or the $\Delta\lambda_1$ being made in accordance with an m-stage pseudorandom binary sequence, the peak wavelength detector detects at least (m+1) peak wavelengths, and the measuring range non-inclusion detector detects a pattern of at least m bits by discriminating whether spaces between the adjacent peak wavelengths are $\Delta\lambda_0$ or $\Delta\lambda_1$ and estimates gratings of the (m+2) or more gratings of which the reflected wavelengths are not included in the measured wavelength range by obtaining a phase of the pseudorandom binary sequence from the pattern of at least m bits.

In the OFDR device, according to a thirteenth aspect of the present invention, each reflectance of (m+1) (m is an integer, m≥2) or more of the gratings is set to either R0 or R1, selection of the R0 or the R1 being made in accordance with an m-stage pseudorandom binary sequence, the peak wavelength detector detects at least m peak wavelengths, and the measuring range non-inclusion detector detects a pattern of at least m bits from the intensities of the peak wavelengths by discriminating whether the reflectances are R0 or R1 and estimates gratings of the (m+1) or more gratings of which the reflected wavelengths are not included in the measured wavelength range by obtaining a phase of the pseudorandom binary sequence from the pattern of at least m bits.

In the OFDR device, according to a fourteenth aspect of the present invention, each reflectance of (m+1) (m is an integer, m≥2) or more of the gratings is set to either R0 or R1, selection of the R0 or the R1 being made in accordance with an m-stage pseudorandom binary sequence, the peak wavelength detector detects at least m peak wavelengths, and the measuring range non-inclusion detector detects a pattern of at least m bits by discriminating whether intensity differences between the adjacent peak wavelengths are zero, R0−R1, or R1−R0 and estimates gratings of the (m+1) or more gratings of which the reflected wavelengths are not included in the measured wavelength range by obtaining a phase of the pseudorandom binary sequence from the pattern of at least m bits.

In the OFDR device, according to a fifteenth aspect of the present invention, each reflectance difference between (m+2) (m is an integer, m≥2) or more of the gratings of which the reflected wavelengths are adjacent is set to either $\Delta R0$ or $\Delta R1$, selection of the $\Delta R0$ or the $\Delta R1$ being made in accordance with an m-stage pseudorandom binary sequence, the peak wavelength detector detects at least (m+1) peak wavelengths, and the measuring range non-inclusion detector detects a pattern of at least m bits from intensity differences between the adjacent peak wavelengths by discriminating whether the reflectance differences are $\Delta R0$ or $\Delta R1$ and estimates gratings of the (m+2) or more gratings of which the reflected wavelengths are not included in the measured wavelength range by obtaining a phase of the pseudorandom binary sequence from the pattern of at least m bits.

According to a sixteenth aspect of the present invention, there is provided an OFDR method for measuring a strain distribution or a temperature distribution of a measured optical fiber in an OFDR device including a light source that outputs wavelength-swept light, a measured optical fiber that includes a fiber Bragg grating unit, an optical splitter/combiner that inputs part of output light from the light source to the measured optical fiber and combines reflected light from the measured optical fiber and part of output light from the light source, an optical receiver that converts light from the optical splitter/combiner into an electrical signal, an A/D converter that converts the electrical signal into a digital signal, a spectrogram calculator that calculates a spectrogram by performing discrete Fourier transform on the digital signal, and a peak wavelength detector that detects one or more peak wavelengths of the spectrogram on a wavelength axis, the method including a setting step of setting measured wavelength range non-inclusion detecting condition data (Ds) that is based on a predetermined measured wavelength range which is set in the direction of a wavelength axis of the peak wavelengths, and a detecting step of detecting gratings of the plurality of gratings of which the reflected wavelengths are not included in the measured wavelength range on the basis of the measured wavelength range non-inclusion detecting condition data and the detected peak wavelength output from the peak wavelength detector, in which the fiber Bragg grating unit includes a plurality of gratings that is overlappingly formed in order to reflect a plurality of different wavelengths, and a strain distribution or a temperature distribution of the measured optical fiber is measured on the basis of a detection results from the detecting step and the peak wavelengths detected by the peak wavelength detector.

In the OFDR method, according to a seventeenth aspect of the present invention, the measured wavelength range non-inclusion detecting condition data (Ds) is set on the basis of a peak wavelength change in the plurality of gratings with respect to a strain or temperature change in the measured optical fiber and of a strain or temperature change range that are formed in plural quantities in the direction of a strain or temperature change axis by dividing a strain or temperature change measurable range and are defined by the measured wavelength range and the peak wavelength change in the plurality of gratings, the measuring range non-inclusion detector detects a strain or temperature change range of the plurality of strain or temperature change ranges that includes a strain or temperature change in the measured optical fiber from the peak wavelengths detected by the peak wavelength detector on the basis of the measured wavelength range non-inclusion detecting condition data (Ds), and a strain distribution or a temperature distribution of the measured optical fiber is measured on the basis of the strain or temperature change range detected by the measuring range non-inclusion detector and the peak wavelengths detected by the peak wavelength detector.

According to an eighteenth aspect of the present invention, the OFDR method further includes a determining step of determining, when the detecting step detects a reflected wavelength of at least one grating of the fiber Bragg grating unit not being included in the measured wavelength range, whether a measurement processing wavelength that is preset to detect a strain or temperature change is included in the peak wavelengths of the gratings of the fiber Bragg grating unit within the measured wavelength range, and a peak wavelength correcting step of converting one or more peak wavelengths of the gratings of the fiber Bragg grating unit within the measured wavelength range into the measurement processing wavelength and outputting the measurement processing wavelength when the measurement processing wavelength is determined not to be included in the peak wavelengths of the gratings of the fiber Bragg grating unit within the measured wavelength range.

In the OFDR method, according to a nineteenth aspect of the present invention, the fiber Bragg grating unit of the measured optical fiber includes three or more gratings that are overlappingly formed, spaces between adjacent reflected wavelengths of the three or more gratings being set to different values, and the detecting step estimates gratings of the three or more gratings of which the reflected wavelengths are not included in the measured wavelength range on the basis of one or more spaces between the peak wavelengths detected by the peak wavelength detector.

In the OFDR method, according to a twentieth aspect of the present invention, the fiber Bragg grating unit of the measured optical fiber includes two or more gratings that are overlappingly formed, reflectances of the two or more gratings being set to different values, and the detecting step estimates gratings of the two or more gratings of which the reflected wavelengths are not included in the measured wavelength range on the basis of one or more intensities of the peak wavelengths detected by the peak wavelength detector.

Advantage of the Invention

The present invention provides an OFDR device and an OFDR method capable of measuring a large strain distribution or a large temperature distribution within a narrow measured wavelength range by using an FBG.

BEST MODE FOR CARRYING OUT THE INVENTION

Hereinafter, embodiments of an OFDR device according to the present invention will be described by using the drawings. While OFDR can measure a strain distribution or a temperature distribution of an optical fiber, the strain distribution and the temperature distribution of the optical fiber are measurable in the same manner. Therefore, hereinafter, a measuring principle of the OFDR device will be described in strain measurement as an example.

Figure 1:
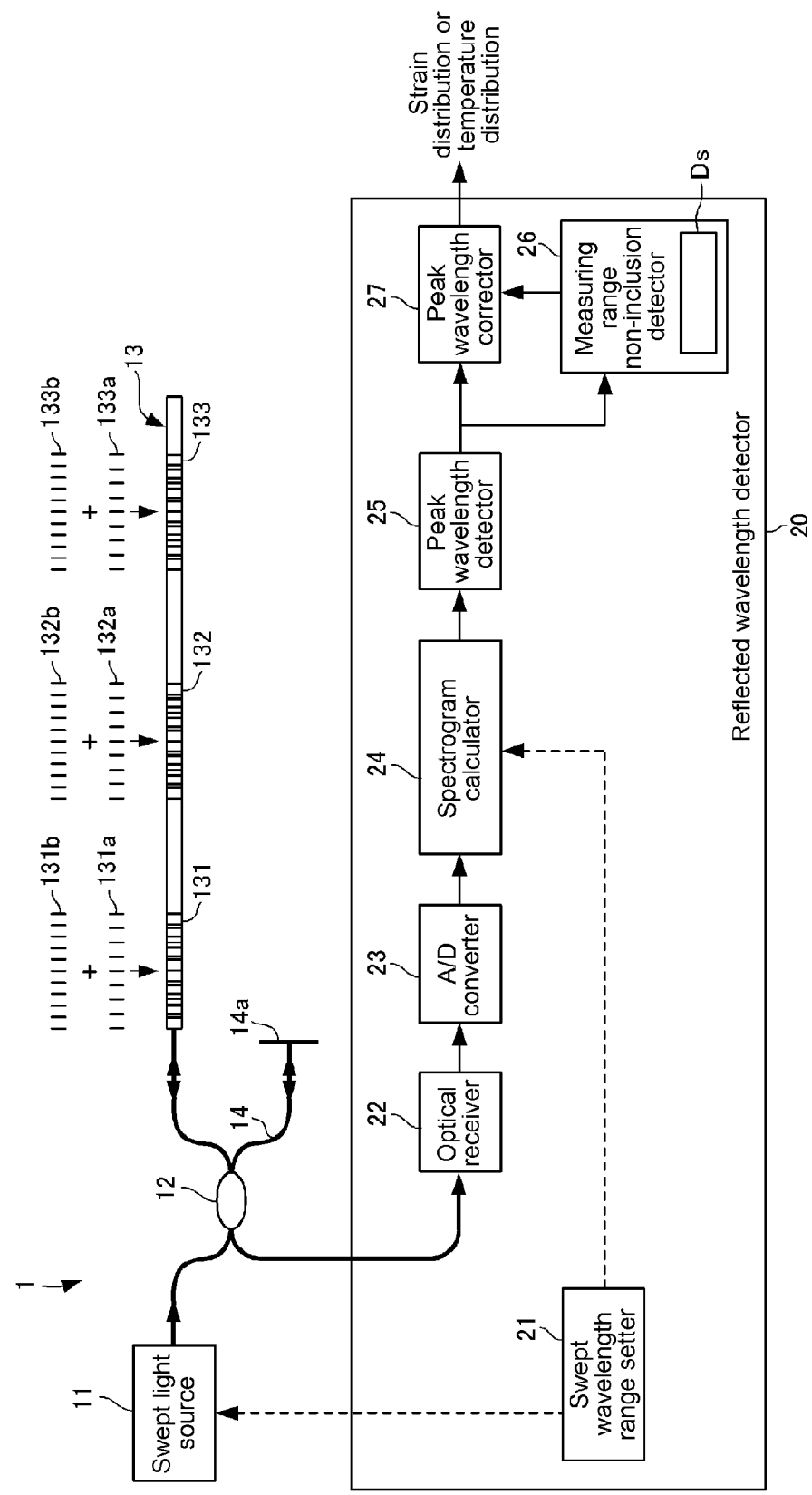
FIG. 1 is a diagram illustrating a configuration of an OFDR device according to the present invention.

FIG. 1 is a diagram illustrating a configuration of the OFDR device according to the present invention. As illustrated in FIG. 1, an OFDR device 1 according to the present invention is configured to include a swept light source 11 that outputs wavelength-swept light, an optical splitter/combiner 12 that is configured of an optical coupler, a measured optical fiber 13 that includes FBGs 131, 132, and 133 (hereinafter, a fiber Bragg grating unit), a reference light optical fiber 14 that includes a mirror having a reflecting coat 14a, and a reflected wavelength detector 20.

The swept light source 11 sweeps the wavelength of output light within a wavelength range and at a sweep speed defined. For example, in an external cavity laser using a grating, the wavelength of lasing can be swept by changing the wavelength of resonance through changing the angle of the grating, a mirror, or the like. Generally, in the OFDR method, ideal sweeping has a frequency of light that linearly changes with respect to time. However, the sweeping used herein is not limited thereto and may be sweeping that has a wavelength of light linearly changing with respect to time or may be sweeping that has a sinusoidally changing wavelength of light.

The sweeping having a linearly changing wavelength has a frequency that changes almost linearly if the wavelength sweep range from the center wavelength is sufficiently small. In a case of the sinusoidal sweeping, the sweeping can be regarded as nearly linear sweeping by using only a region of a sine wave that is comparatively similar to a straight line. In addition, the non-linearity of the sweeping can be corrected by using a separate delay interferometer as disclosed in Patent Document 1 or the like.

The optical splitter/combiner 12 causes the output light from the swept light source 11 to branch into two and causes one branch to be input to the measured optical fiber 13 and the other branch to be input to the reference light optical fiber 14. In addition, the optical splitter/combiner 12 combines and outputs reflected light from the measured optical fiber 13 and a part of the output light from the swept light source 11 that is reflected by the reflecting coat 14a of the reference light optical fiber 14.

The measured optical fiber 13 includes an FBG of a predetermined length. The FBG may be arranged in plural quantities discretely as the FBGs 131, 132, and 133 illustrated in FIG. 1, or there may be only one FBG. The FBG, when being arranged in plural quantities, may have different grating periods or may have the same grating period.

As one of the features of the OFDR device 1 according to the present invention, the measured optical fiber 13 has a configuration in which one or a plurality of the FBGs having different grating periods is overlappingly arranged.

In FIG. 1, for example, the FBG 131 is configured by overlappingly arranging two FBGs 131a and 131b that have different grating periods. Similarly, the FBGs 132 and 133 are respectively configured by overlappingly arranging two FBGs 132a and 132b and two FBGs 133a and 133b having different grating periods. In the description below, the FBGs 131a and 131b, the FBGs 132a and 132b, and the FBGs 133a and 133b that are overlappingly arranged with different grating periods will be referred to as overlappingly arranged FBGs (a plurality of gratings that is overlappingly formed in the fiber Bragg grating unit to reflect a plurality of different wavelengths; the same applies hereinafter).

In the measured optical fiber 13, for example, the FBG 131 can be prepared by writing each of the plurality of overlappingly arranged FBGs 131a and 131b in an optical fiber. The FBG 131 may be prepared by performing writing once in the optical fiber using a mask in which the plurality of overlapped gratings of the overlappingly arranged FBGs 131a and 131b is formed in advance.

The FBG reflects light of a specific wavelength corresponding to the grating period thereof. If the two overlappingly arranged FBGs 131a and 131b having different grating periods are written as the FBG 131 of FIG. 1, the FBG reflects the light of two different wavelengths that respectively correspond to the overlappingly arranged FBGs 131a and 131b.

A longitudinal strain when being exerted on the measured optical fiber 13 changes the two reflected light wavelengths of, for example, the overlappingly arranged FBGs 131a and 131b included in the FBG 131 that constitutes the measured optical fiber 13. The reflected light wavelengths of the two overlappingly arranged FBGs 131a and 131b also change if the temperature of the measured optical fiber 13 changes. The strain and temperature of the measured optical fiber 13 are measurable in the same manner. Thus, strain measurement will be described hereinafter.

The reference light optical fiber 14 reflects light of all wavelengths with the reflecting coat 14a. While the distance from the optical splitter/combiner 12 to the reflecting coat 14a of the reference light optical fiber 14 is set to be less than or equal to the distance from the optical splitter/combiner 12 to the near end of the measured optical fiber 13, the distance may be set to be greater than or equal to the distance from the optical splitter/combiner 12 to the far end of the measured optical fiber 13, or a delay fiber, not illustrated, may be inserted between the optical splitter/combiner 12 and the reflecting coat 14a or between the optical splitter/combiner 12 and the measured optical fiber 13 if necessary.

Light reflected by the measured optical fiber 13 and light (reference light) reflected by the reflecting coat 14a of the reference light optical fiber 14 are combined by the optical splitter/combiner 12, and the reflected light from the measured optical fiber 13 interferes with the reference light. The polarization state of light is unstable if the measured optical fiber 13 or the reference light optical fiber 14 is configured of a general single-mode fiber. Thus, it is possible that an interference signal is not obtained because of orthogonal polarization of the reflected light from the measured optical fiber 13 and the reference light.

In order to avoid such a problem, it is possible to provide a configuration that adjusts polarization by inserting a polarization controller, not illustrated, in at least one of the measured optical fiber 13 and the reference light optical fiber 14. In addition, as another configuration to avoid the problem that an interference signal is not obtained because of orthogonal polarization of the reflected light from the measured optical fiber 13 and the reference light, it is possible to provide a configuration using polarization diversity reception that detects each of two orthogonal polarized components of the reflected light from the measured optical fiber 13.

An optical isolator, not illustrated, may be inserted between the swept light source 11 and the optical splitter/combiner 12 if necessary in order to prevent a negative influence of light reflected by the measured optical fiber 13 and the reflecting coat 14a returning to the swept light source 11 through the optical splitter/combiner 12.

The reflected wavelength detector 20 receives input of output light from the optical splitter/combiner 12 and detects, from the input light, the wavelength of reflected light from at least one of, for example, the overlappingly arranged FBGs 131a and 131b included in the FBG 131 that is arranged in the measured optical fiber 13. While the reflected wavelength detector 20 can also detect, from the output light from the optical splitter/combiner 12, the wavelength of reflected light from at least one of the overlappingly arranged FBGs 132a and 132b from at least one of the FBGs 133a and 133b included in the FBGs 132 and 133, hereinafter, a reflected light wavelength detecting operation will be described, for simplification of description, on the assumption that detected is the wavelength of reflected light from at least one of the overlappingly arranged FBGs 131a and 131b.

The reflected wavelength detector 20 is configured to include a swept wavelength range setter 21 that sets the range of the wavelength swept by the swept light source 11, an optical receiver 22 that converts the output light from the optical splitter/combiner 12 into an electrical signal, an A/D converter 23 that converts the electrical signal into a digital signal, a spectrogram calculator 24 that calculates a spectrogram by performing discrete Fourier transform on the digital signal, a peak wavelength detector 25 that detects the peak of the spectrogram on a wavelength axis, a measuring range non-inclusion detector 26, and a peak wavelength corrector 27.

The optical receiver 22 outputs an electrical signal in proportion to the intensity of input light and outputs a beat signal from the interference of the reference light and the reflected light from the measured optical fiber 13.

The electrical signal that is output from the optical receiver 22 is converted into a digital signal by the A/D converter 23. The spectrogram calculator 24 performs discrete Fourier-transform on the digital signal converted by the A/D converter 23 in each differential wavelength interval and calculates a spectrogram. The peak wavelength detector 25 detects the peak of the spectrogram calculated by the spectrogram calculator 24 in the direction of the wavelength axis in each differential frequency interval.

According to the configuration of the measured optical fiber 13 (refer to FIG. 1) of the present invention, the peak wavelength detector 25 detects the peak wavelengths of reflected light from at least one of the overlappingly arranged FBGs 131a and 131b included in the FBG 131 of the measured optical fiber 13.

The results of detection of the peaks of the reflected light performed by the peak wavelength detector is input into the measuring range non-inclusion detector 26 and into the peak wavelength corrector 27. The measuring range non-inclusion detector 26 and the peak wavelength corrector 27 are characteristic elements of the present invention together with the overlappingly arranged FBGs 131a and 131b. Of these, the measuring range non-inclusion detector 26, in each frequency interval, detects whether the reflected wavelength of the overlappingly arranged FBGs 131a and 131b included in the FBG 131 is not included in the measured wavelength range and, if not included in the measured wavelength range, detects the overlappingly arranged FBG of which the reflected wavelength is not included in the measured wavelength range. The peak wavelength corrector 27 corrects the peak wavelength if the reflected wavelength of the overlappingly arranged FBG 131a or 131b is not included in the measured wavelength range and outputs a strain at each position of the measured optical fiber 13 (strain distribution).

Figure 2:
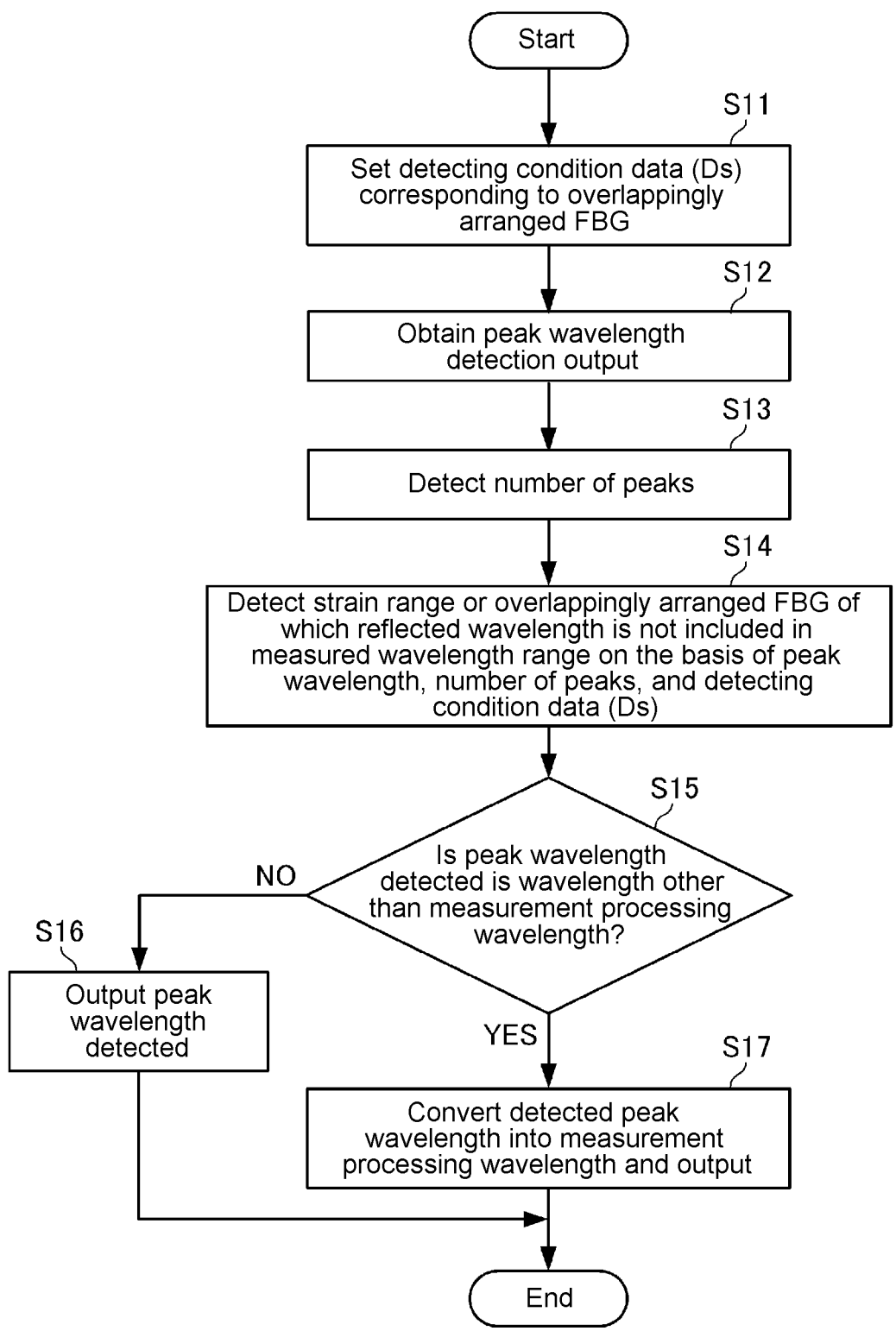
FIG. 2 is a flowchart illustrating a measured wavelength range non-inclusion detecting process using an overlappingly arranged FBG in the OFDR device according to the present invention.

FIG. 2 is a flowchart illustrating a measured wavelength range non-inclusion detecting process using the overlappingly arranged FBG in the OFDR device according to the present invention. The measured wavelength range non-inclusion detecting process will be described on the assumption that the FBG 131 of the measured optical fiber 13 includes two or more overlappingly arranged FBGs 131a, 131b, . . . .

In order to perform the process, first, performed in the OFDR device 1 is a process of setting measured wavelength range non-inclusion detecting condition data (hereinafter, detecting condition data) Ds that corresponds to the overlappingly arranged FBGs 131a, 131b, . . . included in the FBG 131 (Step S11). The detecting condition data Ds, for example, is based on characteristics of a peak change of each of the overlappingly arranged FBGs 131a, 131b, . . . with respect to the strain of the measured optical fiber 13 as illustrated in FIG. 3 to FIG. 6 and FIG. 10 to FIG. 13 and includes a predetermined measured wavelength range that is set in the direction of a peak wavelength axis and a plurality of continuous strain ranges that is set in the direction of a strain axis.

As understood from the strain to peak wavelength change characteristics illustrated in above each drawing, each of the overlappingly arranged FBGs 131a, 131b, . . . constituting the FBG 131 of the measured optical fiber 13 has a structure in which each peak wavelength thereof changes in response to the strain of the measured optical fiber 13 while almost maintaining a space therebetween.

The detecting condition data Ds can be stored into storing means such as a ROM, not illustrated, of the OFDR device 1 from an external apparatus such as a personal computer (PC). FIG. 1 illustrates a configuration in which the detecting condition data Ds is stored in an internal ROM of the measuring range non-inclusion detector 26.

In the OFDR device 1, after the detecting condition data Ds is set in correspondence with the arrangement (structure) of the overlappingly arranged FBGs 131a, 131b, . . . constituting the measured optical fiber 13 in Step S11, the swept light source 11 sweeps output light within the wavelength range and at the sweep speed predefined, and transition is made to a peak wavelength detecting process.

In the peak wavelength detecting process, reflected light from the measured optical fiber 13 and reflected light (reference light) from the reflecting coat 14a of the reference light optical fiber 14 are received by the optical receiver 22, and accordingly, a beat signal from the interference of the reference light and the reflected light from the measured optical fiber 13 is output from the optical receiver 22 and is converted into a digital signal by the A/D converter 23. The spectrogram calculator 24 calculates a spectrogram from the digital signal as an input, and the peak wavelength detector 25 detects the peak wavelengths from the spectrogram in each distance interval of the measured optical fiber 13.

The measuring range non-inclusion detector 26, while the peak wavelength detecting process is performed, obtains the peak wavelengths, detected within the measuring range, of the reflected light of the overlappingly arranged FBGs 131a, 131b, . . . that is output from the peak wavelength detector 25 (Step S12) and detects the number of peak wavelengths (number of peaks) (Step S13).

Next, the measuring range non-inclusion detector 26, on the basis of the peak wavelengths, the number of peaks detected in Step S13, and the detecting condition data Ds set in Step S11, detects a strain range in which the strain of the measured optical fiber 13 in each distance interval is included or detects the overlappingly arranged FBG of which the reflected wavelengths are not included in the measured wavelength range (hereinafter, referred to as measured wavelength range non-inclusion as well) (Step S14).

Next, the measuring range non-inclusion detector 26, when non-inclusion of the reflected wavelengths in the measured wavelength range is detected for at least one overlappingly arranged FBG in Step S14, determines whether a strain or temperature measurement processing wavelength is included in the peak wavelengths of the overlappingly arranged FBG detected by the peak wavelength detector 25, that is, in one of the peak wavelengths of the overlappingly arranged FBG included in the measured wavelength range (hereinafter, referred to as measured wavelength range inclusion as well) (Step S15).

The measurement processing wavelength is a preset specific wavelength that is output by the peak wavelength corrector 27 to a strain (or temperature) detector, not illustrated, in a rear stage to enable strain or temperature measurement and, for example, is exemplified by one of the reflected wavelengths of the overlappingly arranged FBGs 131a, 131b, . . . . A wavelength other than the reflected wavelengths of the overlappingly arranged FBGs 131a, 131b, . . . may also be set as the specific wavelength.

The peak wavelength corrector 27, if the peak wavelength of the overlappingly arranged FBG within the measured wavelength range, that is, one of the peak wavelengths detected by the peak wavelength detector 25, is the measurement processing wavelength in Step S15 (NO in Step S15), outputs one of the detected peak wavelengths without correction (Step S16).

Meanwhile, the peak wavelength corrector 27, if any of the detected peak wavelengths is not the measurement processing wavelength (YES in Step S15), corrects (converts) the detected peak wavelengths to the measurement processing wavelength and outputs the measurement processing wavelength (Step S17).

Then, the strain (or temperature) detector (not illustrated) of the OFDR device 1 measures a strain distribution or a temperature distribution of the measured optical fiber 13 including the overlappingly arranged FBGs 131a, 131b, . . . in each distance interval of the measured optical fiber 13 on the basis of the peak wavelength that is output without correction in Step S16 or of the peak wavelength that is corrected and output in Step S17.

As such, in the present invention, the measuring range non-inclusion detector 26 has the function of estimating a strain region in which the strain of the measured optical fiber 13 is included and the overlappingly arranged FBG of which the reflected wavelengths, of the reflected wavelengths of the plurality of overlapping FBGs 131a, 131b, . . . having peak wavelengths that change in response to the strain of the measured optical fiber 13 while almost maintaining a space therebetween, is not included in the measured wavelength range. Determination of a strain region in which the strain of the measured optical fiber 13 is included and determination of the overlappingly arranged FBG of which the reflected wavelengths are not included in the measured wavelength range are basically equivalent. Thus, either may be performed.

Figure 15:
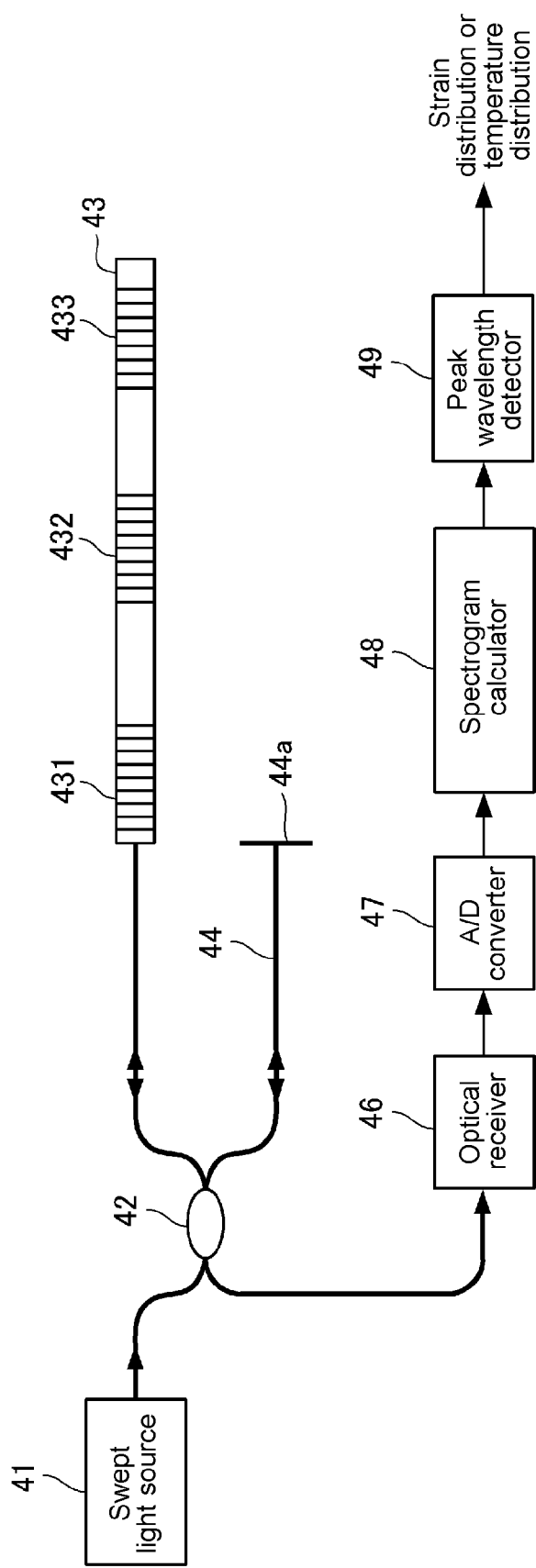
FIG. 15 is a diagram illustrating a configuration of an OFDR device of the related art.
Figure 16:
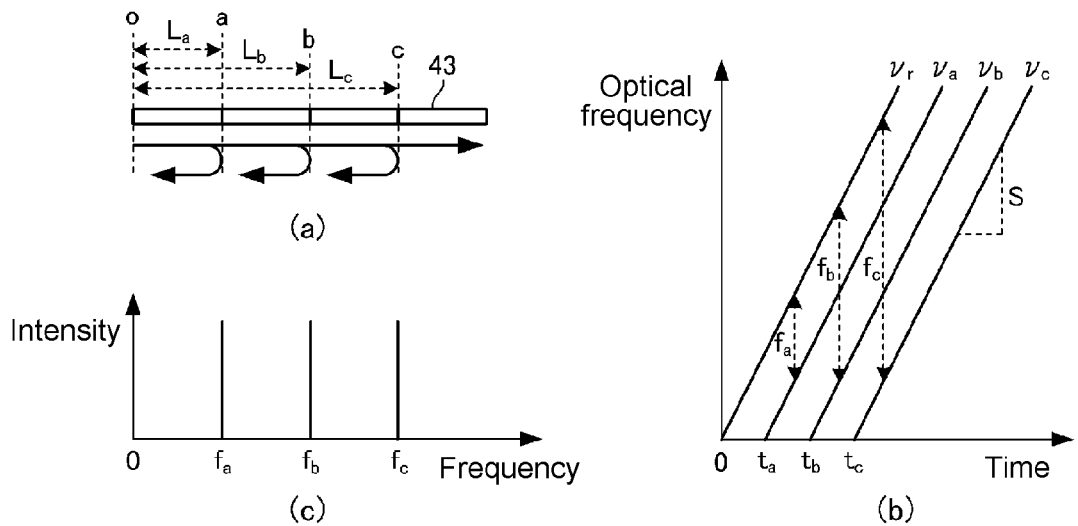
FIG. 16 is a graph illustrating a result of measuring a longitudinal distribution of reflected light from a measured optical fiber in the OFDR device of the related art.
Figure 17:
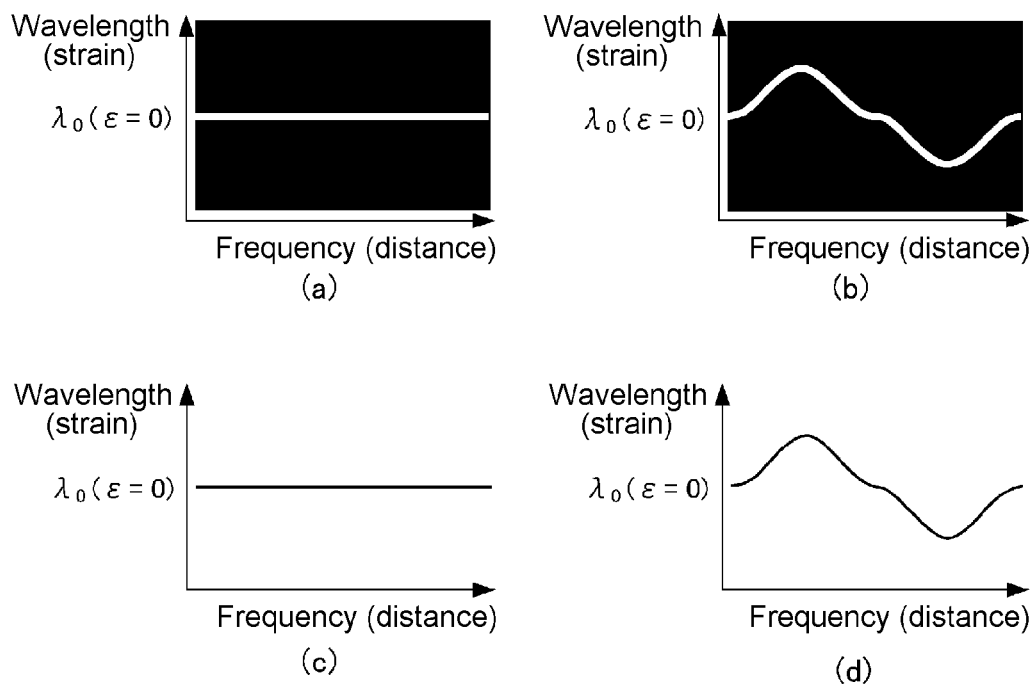
FIG. 17 is a graph illustrating a result of measuring a strain distribution from a spectrogram in the OFDR device of the related art.

Accordingly, in the present invention, it is possible to measure a large strain distribution or a large temperature distribution by using the FBG 131, which includes the overlappingly arranged FBGs 131a, 131b, . . . , while setting a measured wavelength range, for example, narrower than the range of a reflected wavelength change (refer to FIG. 18) of a single FBG (refer to FBGs 431, 432, and 433 in FIG. 15), for characteristics of each peak wavelength change with respect to a strain (or a temperature change) of the overlappingly arranged FBGs 131a, 131b, . . . . Accordingly, an inexpensive configuration that does not require a laser (11) having a wide swept wavelength range, a high-speed optical receiver 22, a high-speed A/D converter 23, and the like can be realized, and a large strain can be detected with a high measuring rate and a long measured distance range.

Hereinafter, processes performed by the measuring range non-inclusion detector 26 and the peak wavelength corrector 27 will be described in detail in first to tenth embodiments as an example (refer to FIG. 3 to FIG. 13). In the first to tenth embodiments, the OFDR device 1, the measured optical fiber 13, the strain range detector 26, the peak wavelength corrector 27, and the strain range detection data Ds will be respectively designated by, for convenience, reference signs 1A to 1J, 13A to 13J, 26A to 26J, 27A to 27J, and Dsa to Dsj for identification in each embodiment.

First Embodiment

A measured optical fiber 13A, in an OFDR device 1A according to the first embodiment, has a configuration that includes two overlappingly arranged FBGs having different grating periods (refer to FIG. 1) as, for example, the overlappingly arranged FBGs 131a and 131b in FIG. 1.

Figure 3:
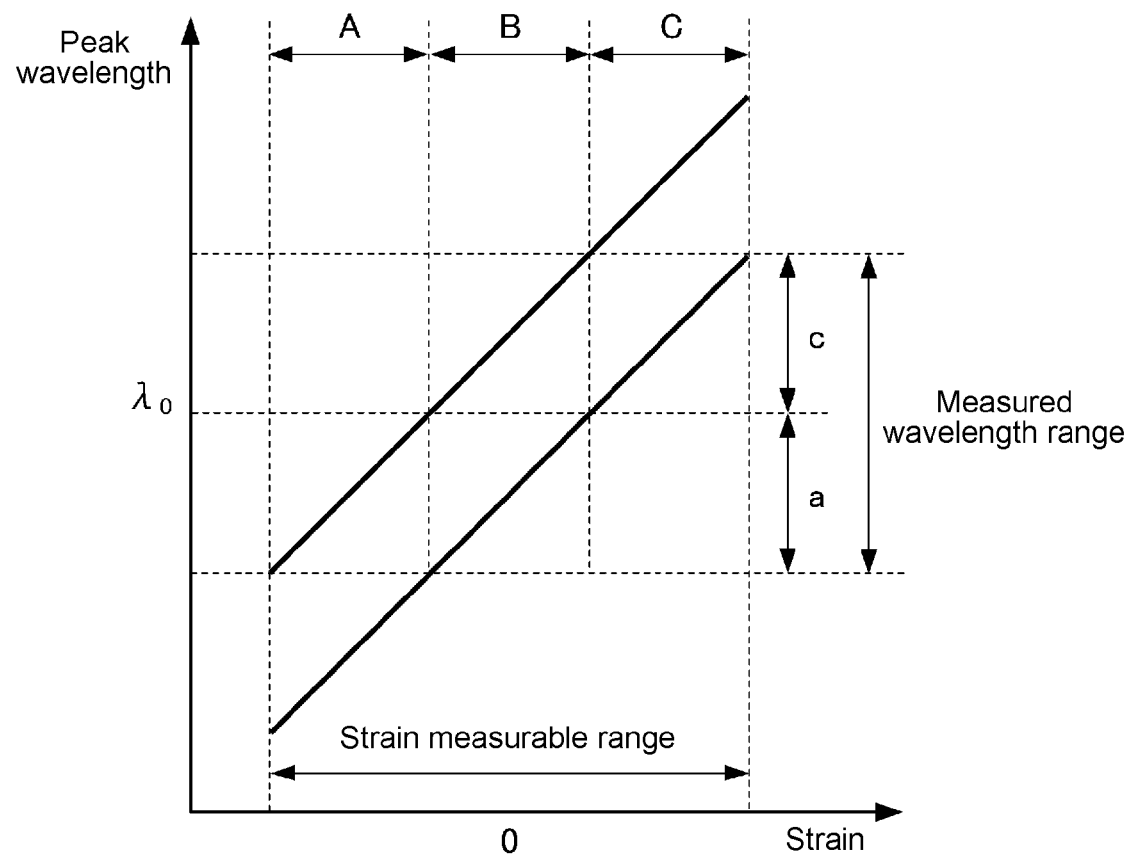
FIG. 3 is a graph illustrating a measured wavelength range non-inclusion detecting condition according to a first embodiment.

FIG. 3 is a graph illustrating a measured wavelength range non-inclusion detecting condition according to the first embodiment. This graph is based on relationship characteristics between a strain of the measured optical fiber 13A and a peak wavelength change when the two overlappingly arranged FBGs having different grating periods are overlappingly written.

As illustrated in FIG. 3, when the measured optical fiber 13A including two overlappingly arranged FBGs is used, reflected light from the measured optical fiber 13A has two peaks that have wavelengths respectively corresponding to the two overlappingly arranged FBGs. If the reflected wavelength difference between these two peaks is sufficiently smaller than the absolute wavelength, both peak wavelengths change while almost maintaining a space between the peak wavelengths when a strain is exerted on the measured optical fiber 13.

In the graph illustrated in FIG. 3, ranges A, B, and C are defined in the direction of a horizontal axis by dividing a strain measurable range into three, and ranges a and c are defined in the direction of a vertical axis by dividing the measured wavelength range into two. If reflected light from the overlappingly arranged FBGs having two wavelengths is observed with respect to the two wavelengths corresponding to the two overlappingly arranged FBGs by defining the strain ranges A, B, and C and the measured wavelength ranges a and c, only the peak wavelength on a long wavelength side is measured in the region of the strain range A while the peak wavelength on a short wavelength side is not included in the measured wavelength range as illustrated in FIG. 3. In the region of the strain range B, both of the two peak wavelengths are measured within the measured wavelength range, and in the region of the strain range C, only the peak wavelength on the short wavelength side is measured while the peak wavelength on the long wavelength side is not included in the measured wavelength range.

A measuring range non-inclusion detector 26A, in the present embodiment, retains detecting condition data Dsa in which the relationship characteristics and the divided regions (strain ranges A, B, C and measured wavelength ranges a and c) illustrated in the graph of FIG. 3 are set.

Accordingly, the measuring range non-inclusion detector 26A, when obtaining the output of the peak wavelength detector 25, detects the number of peak wavelengths, which are detected by the peak wavelength detector 25, of the reflected light from the two overlappingly arranged FBGs by referencing the detecting condition data Dsa and, if the number of peaks detected is two, determines that the peak wavelengths are included in the measured wavelength range (range B).

Meanwhile, the measuring range non-inclusion detector 26A, if the number of peaks detected is one, determines that the peak wavelength on the short wavelength side is not included in the measured wavelength range (range A) when the peak is in the region a of the measured wavelength range and determines that the peak wavelength on the long wavelength side is not included in the measured wavelength range (range C) when the peak is in the region c of the measured wavelength range.

As such, the measuring range non-inclusion detector 26A, in the present embodiment, has the function of setting the space between the reflected wavelengths (two wavelengths) of the two overlappingly arranged FBGs to be less than or equal to ½ of the measured wavelength range (refer to FIG. 3), determining that the reflected wavelengths are included in the measured wavelength range if the number of peak wavelengths detected by the peak wavelength detector 25 is two, determining that the reflected wavelength of the overlappingly arranged FBG on the long wavelength side is not included in the measured wavelength range if there is one detected peak wavelength on the long wavelength side from the middle of the measured wavelength range, and determining that the reflected wavelength of the overlappingly arranged FBG on the short wavelength side is not included in the measured wavelength range if there is one detected peak wavelength on the short wavelength side from the middle of the measured wavelength range.

A peak wavelength corrector 27A, for example, when converting the peak wavelengths into the long wavelength side peak wavelength, outputs the measured peak wavelengths in the range A, outputs the long wavelength side peak wavelength of the two measured peak wavelengths in the range B, and outputs the measured peak wavelengths to which the reflected wavelength space is added in the range C. Similarly, conversion can be performed into the short wavelength side peak wavelength or into the middle level between both of the peak wavelengths.

Conversion may be performed into either the long wavelength side peak wavelength, the short wavelength side peak wavelength, or the middle level between both of the peak wavelengths by calculating the average value of the two peak wavelengths measured, in which case the feature obtained is that measurement accuracy is improved by averaging the two peak wavelengths in the region of the range B where the absolute value of a strain is small.

While FIG. 3 illustrates a case where the reflected wavelength space between the two overlappingly arranged FBGs is ½ of the measured wavelength range, this illustration is not for limitation purposes. The measured wavelength range non-inclusion can be detected if the reflected wavelength space between the two overlappingly arranged FBGs is less than or equal to ½ of the measured wavelength range.

Given that the measured wavelength range is $\Delta\lambda_m$ and that the reflected wavelength space between the two overlappingly arranged FBGs is $\Delta\lambda_s$, a strain measurable range $\Delta\epsilon$ is represented as follows according to the method of the present embodiment in which the strain of the measured optical fiber 13A is measured by using reflected light of two different wavelengths from two overlappingly arranged FBGs.

$$\Delta\varepsilon = \frac{\Delta\lambda m + \Delta\lambda s}{a} \quad (8)$$

Figure 18:
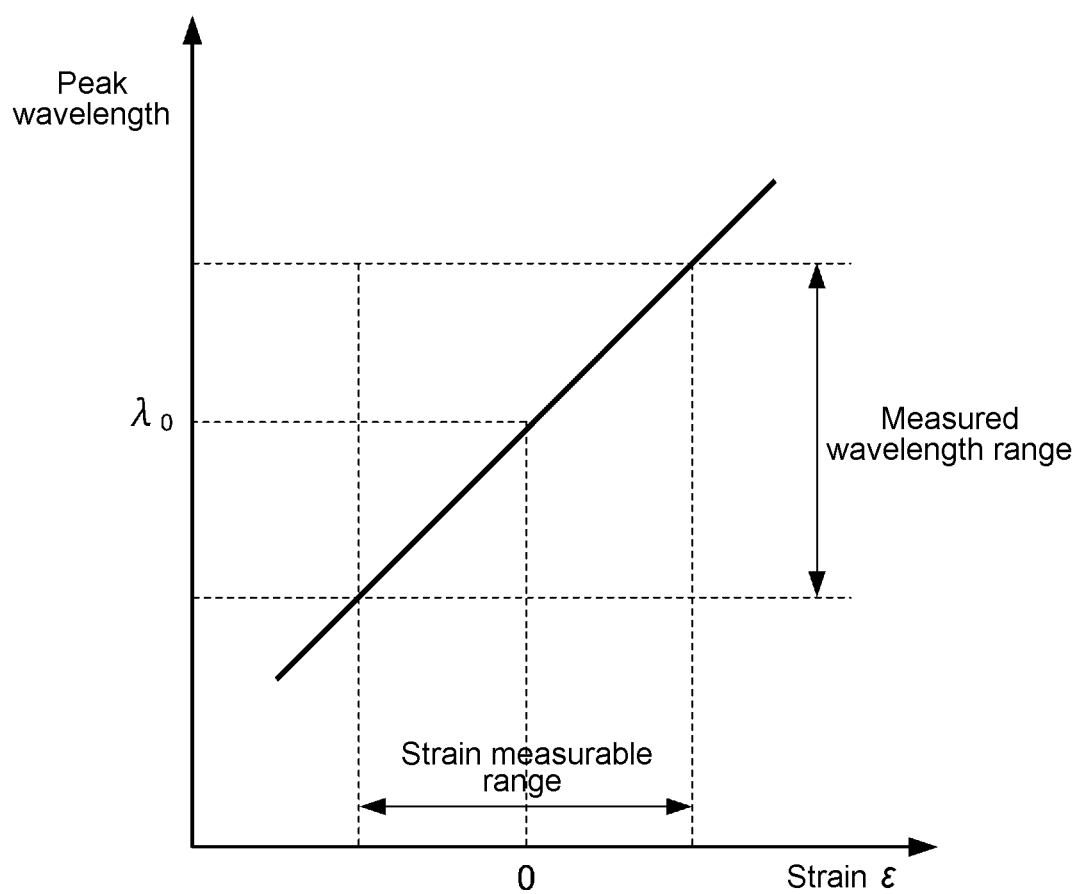
FIG. 18 is a graph illustrating relationship characteristics between a strain of the measured optical fiber and a reflected wavelength change of the FBG.

Accordingly, the reflected wavelength space $\Delta\lambda_s$ between the two overlappingly arranged FBGs is desirably as large as possible. In a case of $\Delta\lambda_s=\Delta\lambda_m/2$, the above expression yields $\Delta\epsilon=1.5\Delta\lambda_m/a$, and a strain that can be measured in the same measured wavelength range is maximum 1.5 times larger than a strain measured in the manner of the related art (FIG. 18).

While the measured wavelength range is illustrated as being the same as in the manner of the related art, the measured wavelength range can be two-thirds of that in the manner of the related art by using the same strain measuring range as in the manner of the related art. Decreasing the measured wavelength range can also decrease the wavelength sweep range of a laser and facilitates preparation of the laser. In addition, if the wavelength sweep range is decreased without a change in the sweep frequency of the laser, the wavelength sweep speed is decreased, and the frequency of the beat signal is decreased. Thus, the bandwidth of the optical receiver 22 or the sampling rate of the A/D converter 23 can be decreased, and the device becomes inexpensive. Alternatively, if the wavelength sweep speed is decreased, the measured distance range can be increased without an increase in the frequency of the beat signal.

Time resolution of the measurement is improved with an increased sweep frequency if the wavelength sweep range is decreased without a change in the wavelength sweep speed. The effect of the present method can be appropriately divided into increasing the strain measuring range, decreasing the wavelength sweep range of a laser, decreasing the frequency of the beat signal, increasing the measured distance range, and increasing the measuring rate, and the same applies in the embodiments below.

Second Embodiment

A measured optical fiber 13B, in an OFDR device 1B according to the second embodiment, has a configuration that includes three overlappingly arranged FBGs having different grating periods.

Figure 4:
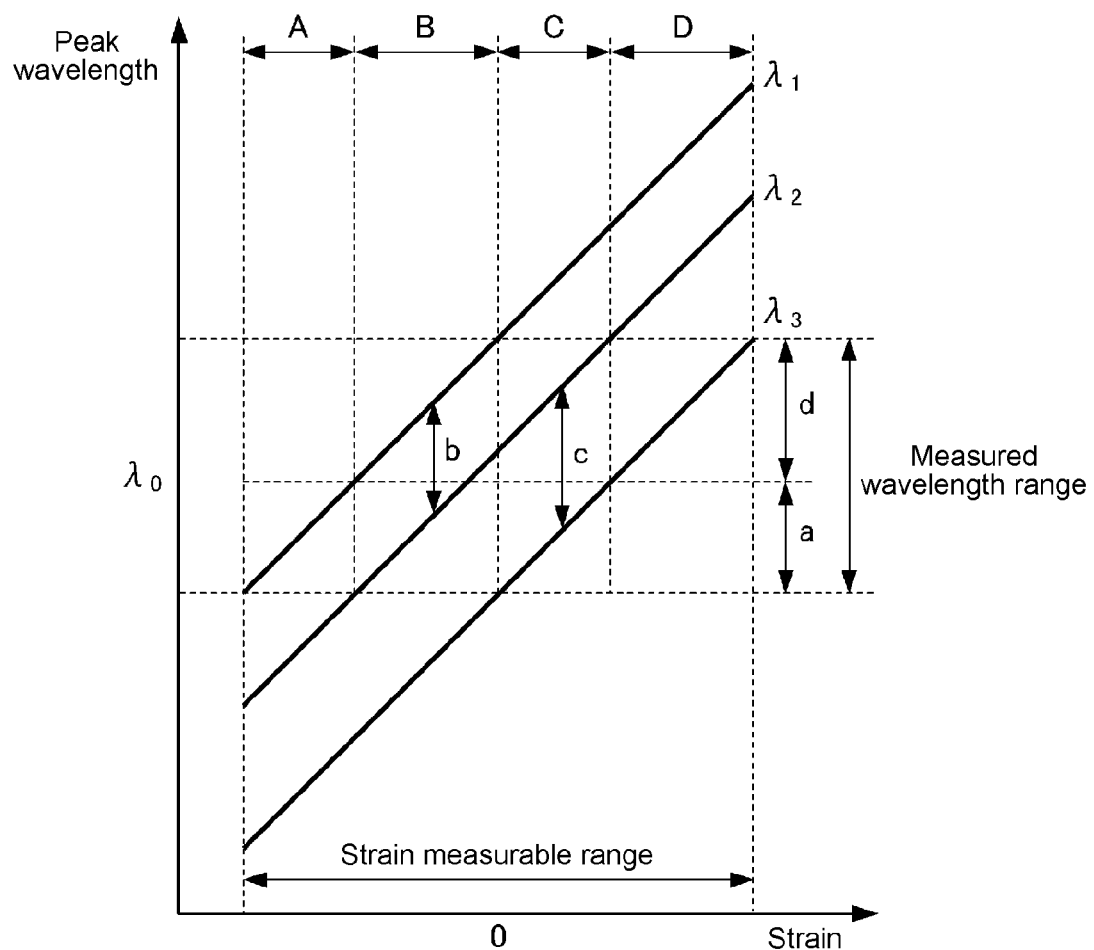
FIG. 4 is a graph illustrating a measured wavelength range non-inclusion detecting condition according to a second embodiment.

FIG. 4 is a graph illustrating a measured wavelength range non-inclusion detecting condition according to the second embodiment. This graph is based on relationship characteristics between a strain of the measured optical fiber 13B and a peak wavelength change when the three overlappingly arranged FBGs having different grating periods are overlappingly written.

As illustrated in FIG. 4, when the measured optical fiber 13B that includes three overlappingly arranged FBGs is used, reflected light from the measured optical fiber 13B has three peaks that have different wavelengths respectively corresponding to the three overlappingly arranged FBGs.

The reflected wavelengths of the three overlappingly arranged FBGs are designated by reference signs $\lambda_1$, $\lambda_2$, and $\lambda_3$ in order from the long wavelength side in FIG. 4. The space $\lambda_1$–$\lambda_3$ between the reflected wavelengths of both end overlappingly arranged FBGs is equal to the measured wavelength range, and the spaces $\lambda_1$–$\lambda_2$ and $\lambda_2$–$\lambda_3$ between the adjacent reflected wavelengths are set to different values. When the measured optical fiber 13B is used, reflected light from the measured optical fiber 13B has three peaks of different wavelengths as in FIG. 4. If a strain is exerted on the measured optical fiber 13B, the three peak wavelengths change while almost maintaining the spaces between the peak wavelengths.

In the graph illustrated in FIG. 4, regarding the strain measurable range represented by a horizontal axis, strain ranges A, B, C, and D are defined by dividing the strain measurable range into four regions. Regarding the measured wavelength region represented by a vertical axis, regions a and d are defined by dividing the measured wavelength range that is equal to the space $\lambda_1$–$\lambda_3$ between the reflected wavelengths of both end overlappingly arranged FBGs into two regions, and wavelength spaces b and c that respectively correspond to the spaces $\lambda_1-\lambda_2$ and $\lambda_2-\lambda_3$ between the reflected wavelengths of the adjacent overlappingly arranged FBGs are defined.

If reflected light from the overlappingly arranged FBGs having three wavelengths is observed with respect to the three wavelengths by defining the ranges A, B, C, and D, the regions a and d of the measured wavelength range, and the wavelength spaces b and c, only $\lambda_1$ is measured in the region of the strain range A while $\lambda_2$ and $\lambda_3$ are not included in the measured wavelength range as illustrated in FIG. 4. In the region of the strain range B, $\lambda_1$ and $\lambda_2$ are measured while $\lambda_3$ is not included in the measured wavelength range. In the region of the strain range C, $\lambda_2$ and $\lambda_3$ are measured while $\lambda_1$ is not included in the measured wavelength range. In the region of the strain range D, only $\lambda_3$ is measured while $\lambda_1$ and $\lambda_2$ are not included in the measured wavelength range.

A measuring range non-inclusion detector 26B, in the OFDR device 1B according to the present embodiment, retains detecting condition data Dsb in which the relationship characteristics and the divided regions (strain regions A, B, C, and D, regions a and d of the measured wavelength range, and wavelength spaces b and c) illustrated in the graph of FIG. 4 are set.

Accordingly, the measuring range non-inclusion detector 26B, when obtaining the output of the peak wavelength detector 25, detects the number of peak wavelengths, which are detected by the peak wavelength detector 25, of the reflected light from the overlappingly arranged FBGs by referencing the detecting condition data Dsb and, if there is one detected peak in the region a of the measured wavelength range, determines that $\lambda_2$ and $\lambda_3$ are not included in the measured wavelength range (range A) and, if the peak is in the region d of the measured wavelength range, determines that $\lambda_1$ and $\lambda_2$ are not included in the measured wavelength range (range D).

The measuring range non-inclusion detector 26B, if the number of peaks detected is two, determines that $\lambda_3$ is not included in the measured wavelength range (range B) when the peak wavelength space is $\lambda_1-\lambda_2$ (refer to the wavelength space b) and determines that $\lambda_1$ is not included in the measured wavelength range (range C) when the peak wavelength space is $\lambda_2-\lambda_3$ (refer to the wavelength space c). In actuality, error exists in the peak wavelength measurement. Thus, discrimination is performed by using middle wavelength space of $\lambda_1-\lambda_2$ and $\lambda_2-\lambda_3$.

A peak wavelength corrector 27B, for example, when converting the peak wavelengths into the peak wavelength $\lambda_1$, outputs the measured peak wavelengths in the range A, outputs the long wavelength side peak wavelength of the two measured peak wavelengths in the range B, outputs the long wavelength side peak wavelength of the two measured peak wavelengths to which $\lambda_1-\lambda_2$ is added in the range C, and outputs the measured peak wavelengths to which $\lambda_1-\lambda_3$ is added in the range D. Similarly, conversion can be performed into $\lambda_2$, $\lambda_3$, or $(\lambda_1+\lambda_3)/2$.

Conversion may be performed into $(\lambda_1+\lambda_3)/2$ by calculating the average value of the two peak wavelengths measured, in which case the feature obtained is that measurement accuracy is improved by averaging the two peak wavelengths in the regions of the range B and the range C where the absolute value of a strain is small.

While FIG. 4 illustrates a case where $\lambda_1-\lambda_3$ is equal to the measured wavelength range, this illustration is not for limitation purposes. The measured wavelength range non-inclusion can be detected if $\lambda_1-\lambda_3$ is less than or equal to the measured wavelength range.

According to the method of the present embodiment in which the strain of the measured optical fiber 13B is measured by changing the space between three different wavelengths of reflected light from three overlappingly arranged FBGs, the strain measurable range $\Delta\epsilon$ is represented as follows.

$$\Delta\varepsilon = \frac{\Delta\lambda m + \lambda 1 - \lambda 3}{a} \qquad (9)$$

Accordingly, the reflected wavelength space $\lambda_1-\lambda_3$ is desirably as large as possible. In a case of $\lambda_1-\lambda_3=\Delta\lambda_m$, the above expression yields $\Delta\epsilon=2\Delta\lambda_m/a$, and a strain that can be measured in the same measured wavelength range is maximum twice as large as a strain measured in the manner of the related art (FIG. 18).

Third Embodiment

A measured optical fiber 13C, in an OFDR device 1C according to the third embodiment, has a configuration that includes four overlappingly arranged FBGs having different grating periods.

Figure 5:
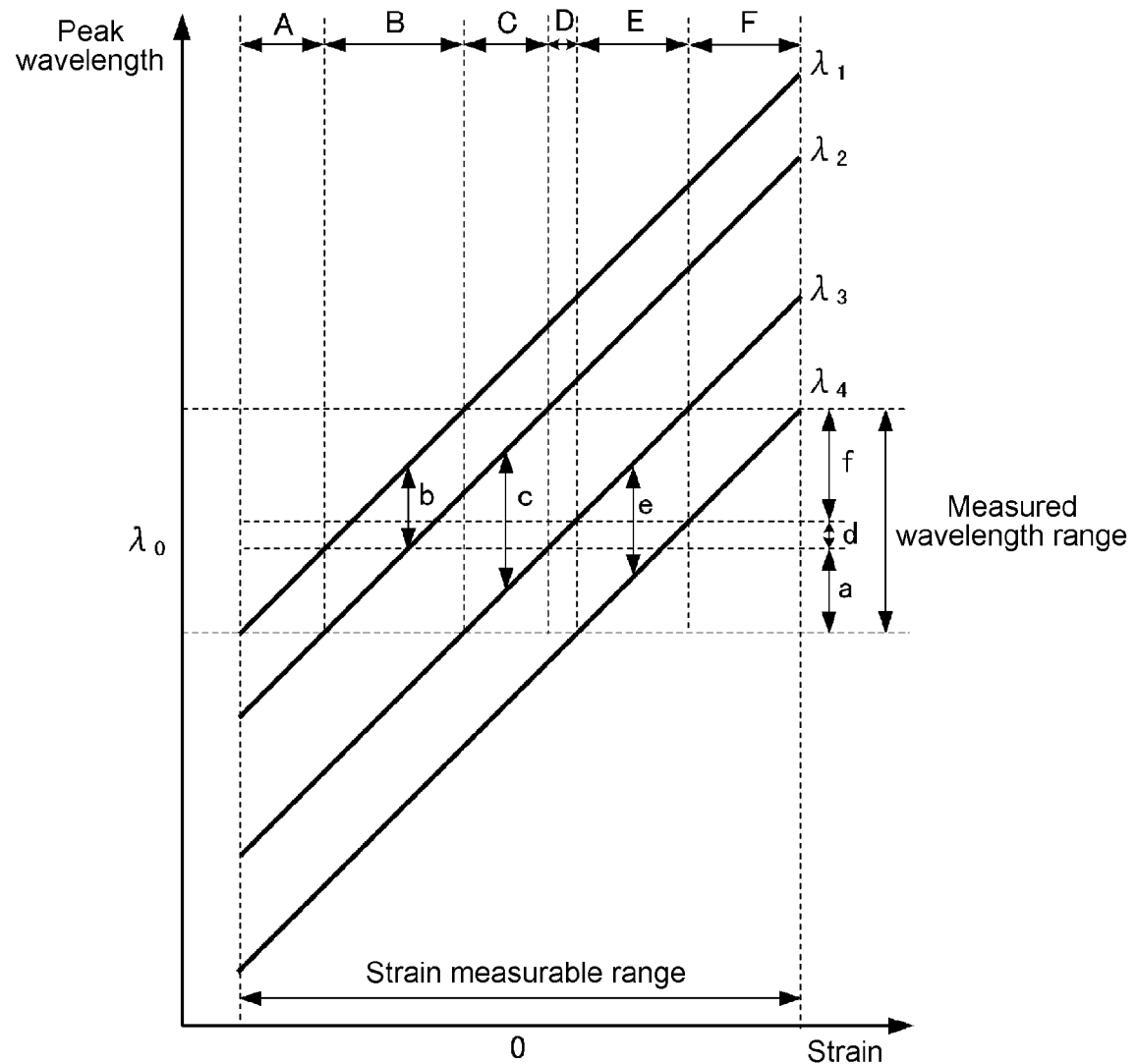
FIG. 5 is a graph illustrating a measured wavelength range non-inclusion detecting condition according to a third embodiment.

FIG. 5 is a graph illustrating a measured wavelength range non-inclusion detecting condition according to the third embodiment. This graph is based on relationship characteristics between a strain of the measured optical fiber 13C and a peak wavelength change when the four overlappingly arranged FBGs having different grating periods are overlappingly written.

As illustrated in FIG. 5, when the measured optical fiber 13C that includes four overlappingly arranged FBGs is used, reflected light from the measured optical fiber 13C has four peaks that have different wavelengths respectively corresponding to the four overlappingly arranged FBGs. The reflected wavelengths of the four overlappingly arranged FBGs are designated by reference signs $\lambda_1$, $\lambda_2$, $\lambda_3$, and $\lambda_4$ in order from the long wavelength side in FIG. 5. The space $\lambda_1-\lambda_4$ between the reflected wavelengths of both end overlappingly arranged FBGs is equal to 3/2 of the measured wavelength range, and each of the spaces $\lambda_1-\lambda_2$, $\lambda_2-\lambda_3$, and $\lambda_3-\lambda_4$ between the adjacent reflected wavelengths is set to a different value.

When the measured optical fiber 13C is used, reflected light therefrom has four peaks of different wavelengths as in FIG. 5. If a strain is exerted on the measured optical fiber 13C, the four peak wavelengths change while almost maintaining the spaces between the peak wavelengths.

In the graph illustrated in FIG. 5, six regions (strain ranges) A, B, C, D, E, and F are defined regarding the strain measurable range represented by a horizontal axis. Regarding the measured wavelength region represented by a vertical axis, regions a, d, and f are defined by dividing the measured wavelength range into three regions, and wavelength spaces b, c, and e that respectively correspond to the spaces $\lambda_1-\lambda_2$, $\lambda_2-\lambda_3$, and $\lambda_3-\lambda_4$ between the reflected wavelengths of the adjacent overlappingly arranged FBGs are defined.

If reflected light from the overlappingly arranged FBGs having four wavelengths is observed with respect to the four wavelengths by defining the ranges A, B, C, D, E, and F, the regions a, d, and f of the measured wavelength range, and the wavelength spaces b, c, and e, only $\lambda_1$ is measured in the region of the strain range A while $\lambda_2$, $\lambda_3$, and $\lambda_4$ are not included in the measured wavelength range as illustrated in FIG. 5.

In the region of the strain range B, $\lambda_1$ and $\lambda_2$ are measured while $\lambda_3$ and $\lambda_4$ are not included in the measured wavelength range. In the region of the strain range C, $\lambda_2$ and $\lambda_3$ are measured while $\lambda_1$ and $\lambda_4$ are not included in the measured wavelength range. In the region of the strain range D, only $\lambda_3$ is measured while $\lambda_1$, $\lambda_2$, and $\lambda_4$ are not included in the measured wavelength range. In the region of the strain range E, $\lambda_3$ and $\lambda_4$ are measured while $\lambda_1$ and $\lambda_2$ are not included in the measured wavelength range. In the region of the strain range F, only $\lambda_4$ is measured while $\lambda_1$, $\lambda_2$, and $\lambda_3$ are not included in the measured wavelength range.

A measuring range non-inclusion detector 26C, in the OFDR device 1C according to the present embodiment, retains detecting condition data Dsc in which the relationship characteristics and the divided regions (strain regions A to F, regions a, d, and f of the measured wavelength range, and wavelength spaces b, c, and e) illustrated in the graph of FIG. 5 are set.

Accordingly, the measuring range non-inclusion detector 26C, when obtaining the output of the peak wavelength detector 25, detects the number of peak wavelengths, which are detected by the peak wavelength detector 25, of the reflected light from the overlappingly arranged FBGs by referencing the detecting condition data Dsc and, if there is one detected peak in the region a of the measured wavelength range, determines that $\lambda_2$, $\lambda_3$, and $\lambda_4$ are not included in the measured wavelength range (range A) and, if the peak is in the region d of the measured wavelength range, determines that $\lambda_1$, $\lambda_2$, and $\lambda_4$ are not included in the measured wavelength range (range D) and, if the peak is in the region f of the measured wavelength range, determines that $\lambda_1$, $\lambda_2$, and $\lambda_3$ are not included in the measured wavelength range (range F).

The measuring range non-inclusion detector 26C, if the number of peaks detected is two, determines that $\lambda_3$ and $\lambda_4$ are not included in the measured wavelength range (range B) when the peak wavelength space is $\lambda_1$–$\lambda_2$ (refer to the wavelength space b), determines that $\lambda_1$ and $\lambda_4$ are not included in the measured wavelength range (range C) when the peak wavelength space is $\lambda_2$–$\lambda_3$ (refer to the wavelength space c), and determines that $\lambda_1$ and $\lambda_2$ are not included in the measured wavelength range (range E) when the peak wavelength space is $\lambda_3$–$\lambda_4$ (refer to the wavelength space e).

A peak wavelength corrector 27C, for example, when converting the peak wavelengths into the peak wavelength $\lambda_1$, outputs the measured peak wavelengths in the range A, outputs the long wavelength side peak wavelength of the two measured peak wavelengths in the range B, outputs the long wavelength side peak wavelength of the two measured peak wavelengths to which $\lambda_1$–$\lambda_2$ is added in the range C, outputs the measured peak wavelengths to which $\lambda_1$–$\lambda_3$ is added in the range D, outputs the long wavelength side peak wavelength of the two measured peak wavelengths to which $\lambda_1$–$\lambda_3$ is added in the range E, and outputs the measured peak wavelengths to which $\lambda_1$–$\lambda_4$ is added in the range F.

Similarly, conversion can be performed into $\lambda_2$, $\lambda_3$, $\lambda_4$, or $(\lambda_1+\lambda_4)/2$. Conversion into $\lambda_1$, $\lambda_2$, $\lambda_3$, $\lambda_4$, or $(\lambda_1+\lambda_4)/2$ may be performed by calculating the average value of the two measured peak wavelengths.

While FIG. 5 illustrates a case where $\lambda_1$–$\lambda_4$ is equal to 3/2 times the measured wavelength range, this illustration is not for limitation purposes. The measured wavelength range non-inclusion can be detected if $\lambda_1$–$\lambda_4$ is less than or equal to 3/2 times the measured wavelength range.

According to the method of the present embodiment in which the strain of the measured optical fiber 13C is measured by changing the space between four different wavelengths of reflected light from four overlappingly arranged FBGs, the strain measurable range $\Delta\epsilon$ is represented as follows.

$$\Delta\varepsilon = \frac{\Delta\lambda m + \lambda 1 - \lambda 4}{a} \quad (10)$$

Accordingly, the reflected wavelength space $\lambda_1$–$\lambda_4$ is desirably as large as possible. In a case of $\lambda_1$–$\lambda_4$=1.5$\Delta\lambda_m$, the above expression yields $\Delta\epsilon$=2.5$\Delta\lambda_m$/a, and a strain that can be measured in the same measured wavelength range is maximum 2.5 times larger than a strain measured in the manner of the related art (FIG. 18).

Fourth Embodiment

A measured optical fiber 13D, in an OFDR device 1D according to the fourth embodiment, has a configuration in which five overlappingly arranged FBGs having different grating periods are overlappingly written.

Figure 6:
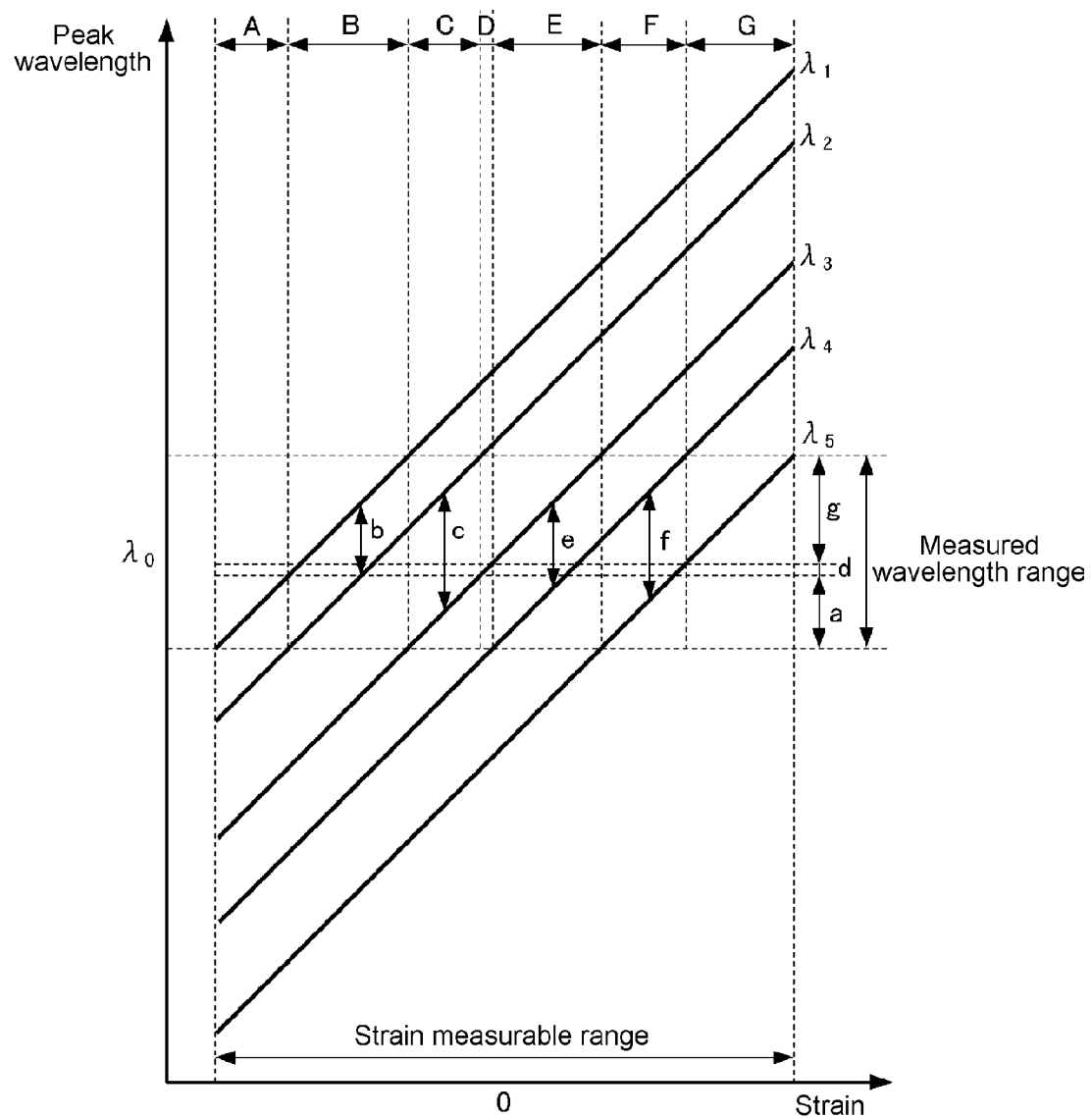
FIG. 6 is a graph illustrating a measured wavelength range non-inclusion detecting condition according to a fourth embodiment.

FIG. 6 is a graph illustrating a measured wavelength range non-inclusion detecting condition according to the fourth embodiment and is based on relationship characteristics between a strain of the measured optical fiber 13D including the five overlappingly arranged FBGs and a peak wavelength change.

As illustrated in FIG. 6, when the measured optical fiber 13D that includes five overlappingly arranged FBGs is used, reflected light from the measured optical fiber 13D has five peaks that have different wavelengths respectively corresponding to the five overlappingly arranged FBGs. The reflected wavelengths of the five overlappingly arranged FBGs are designated by reference signs $\lambda_1$, $\lambda_2$, $\lambda_3$, $\lambda_4$, and $\lambda_5$ in order from the long wavelength side in FIG. 6. The space $\lambda_1$–$\lambda_5$ between the reflected wavelengths of both end overlappingly arranged FBGs is twice as large as the measured wavelength range, and each of the spaces $\lambda_1$–$\lambda_2$, $\lambda_2$–$\lambda_3$, $\lambda_3$–$\lambda_4$, and $\lambda_4$–$\lambda_5$ between the adjacent reflected wavelengths is set to a different value.

When the measured optical fiber 13D is used, reflected light from the measured optical fiber 13D has five peaks of different wavelengths as illustrated in FIG. 6. If a strain is exerted on the measured optical fiber 13D, the five peak wavelengths change while almost maintaining the spaces between the peak wavelengths.

In the present embodiment that uses the measured optical fiber 13D including the overlappingly arranged FBGs of five wavelengths, in FIG. 6, seven regions (strain ranges) A, B, C, D, E, F, and G are defined regarding the strain measurable range represented by a horizontal axis. Regarding the measured wavelength range represented by a vertical axis, the measured wavelength range is divided into three regions a, d, and g, and wavelength spaces b, c, e, and f that respectively correspond to the spaces $\lambda_1$–$\lambda_2$, $\lambda_2$–$\lambda_3$, $\lambda_3$–$\lambda_4$, and $\lambda_4$–$\lambda_5$ between the reflected wavelengths of the adjacent overlappingly arranged FBGs are defined.

Then, if the reflected light from the measured optical fiber 13D that uses the overlappingly arranged FBGs of five wavelengths is observed, only $\lambda_1$ is measured in the region of the strain range A while $\lambda_2$, $\lambda_3$, $\lambda_4$, and $\lambda_5$ are not included in the measured wavelength range as illustrated in FIG. 6. In the region of the strain range B, $\lambda_1$ and $\lambda_2$ are measured while $\lambda_3$, $\lambda_4$, and $\lambda_5$ are not included in the measured wavelength range. In the region of the strain range C, $\lambda_2$ and $\lambda_3$ are measured while $\lambda_1$, $\lambda_4$, and $\lambda_5$ are not included in the measured wavelength range. In the region of the strain range D, only $\lambda_3$ is measured while $\lambda_1$, $\lambda_2$, $\lambda_4$, and $\lambda_5$ are not included in the measured wavelength range. In the region of the strain range E, $\lambda_3$ and $\lambda_4$ are measured while $\lambda_1$, $\lambda_2$, and $\lambda_5$ are not included in the measured wavelength range. In the region of the strain range F, $\lambda_4$ and $\lambda_5$ are measured while $\lambda_1$, $\lambda_2$, and $\lambda_3$ are not included in the measured wavelength range. In the region of the strain range G, only $\lambda_5$ is measured while $\lambda_1$, $\lambda_2$, $\lambda_3$, and $\lambda_4$ are not included in the measured wavelength range.

A measuring range non-inclusion detector 26D, in the OFDR device 1D according to the present embodiment, retains detecting condition data Dsd in which the relationship characteristics between the strain of the measured optical fiber 13D and a peak wavelength change illustrated in FIG. 6 are associated with the strain ranges A to G, the regions a, d, and g of the measured wavelength range, and the wavelength spaces b, c, e, and f.

Accordingly, in the OFDR device 1D, the measuring range non-inclusion detector 26D, when obtaining the output of the peak wavelength detector 25, detects the number of peak wavelengths, which are detected by the peak wavelength detector 25, of the reflected light from the overlappingly arranged FBGs by referencing the detecting condition data Dsd and, if there is one detected peak in the region a of the measured wavelength range, determines that $\lambda_2$, $\lambda_3$, $\lambda_4$, and $\lambda_5$ are not included in the measured wavelength range (range A) and, if the peak is in the region d of the measured wavelength range, determines that $\lambda_1$, $\lambda_2$, $\lambda_4$, and $\lambda_5$ are not included in the measured wavelength range (range D) and, if the peak is in the region g of the measured wavelength range, determines that $\lambda_1$, $\lambda_2$, $\lambda_3$, and $\lambda_4$ are not included in the measured wavelength range (range G).

The measuring range non-inclusion detector 26D, if the number of peaks detected is two, determines that $\lambda_3$, $\lambda_4$, and $\lambda_5$ are not included in the measured wavelength range (range B) when the peak wavelength space is $\lambda_1$-$\lambda_2$ (refer to the wavelength space b), determines that $\lambda_1$, $\lambda_4$, and $\lambda_5$ are not included in the measured wavelength range (range C) when the peak wavelength space is $\lambda_2$-$\lambda_3$ (refer to the wavelength space c), determines that $\lambda_1$, $\lambda_2$, and $\lambda_5$ are not included in the measured wavelength range (range E) when the peak wavelength space is $\lambda_3$-$\lambda_4$ (refer to the wavelength space e), and determines that $\lambda_1$, $\lambda_2$, and $\lambda_3$ are not included in the measured wavelength range (range F) when the peak wavelength space is $\lambda_4$-$\lambda_5$ (refer to the wavelength space f).

A peak wavelength corrector 27D, for example, when converting the peak wavelengths into the peak wavelength $\lambda_1$, outputs the measured peak wavelengths in the range A, outputs the long wavelength side peak wavelength of the two measured peak wavelengths in the range B, outputs the long wavelength side peak wavelength of the two measured peak wavelengths to which $\lambda_1$-$\lambda_2$ is added in the range C, outputs the measured peak wavelengths to which $\lambda_1$-$\lambda_3$ is added in the range D, outputs the long wavelength side peak wavelength of the two measured peak wavelengths to which $\lambda_1$-$\lambda_3$ is added in the range E, outputs the long wavelength side peak wavelength of the two measured peak wavelengths to which $\lambda_1$-$\lambda_4$ is added in the range F, and outputs the measured peak wavelengths to which $\lambda_1$-$\lambda_5$ is added in the range G.

Similarly, conversion can be performed into $\lambda_2$, $\lambda_3$, $\lambda_4$, $\lambda_5$, or $(\lambda_1+\lambda_5)/2$. Conversion into $\lambda_1$, $\lambda_2$, $\lambda_3$, $\lambda_4$, $\lambda_5$, or $(\lambda_1+\lambda_5)/2$ may be performed by calculating the average value of the two measured peak wavelengths.

While FIG. 6 illustrates a case where $\lambda_1$-$\lambda_5$ is equal to double the measured wavelength range, this illustration is not for limitation purposes. The measured wavelength range non-inclusion can be detected if $\lambda_1$-$\lambda_5$ is less than or equal to double the measured wavelength range.

According to the method of the present embodiment in which the strain of the measured optical fiber 13D is measured by changing the space between five different wavelengths of reflected light from five overlappingly arranged FBGs, the strain measurable range $\Delta\epsilon$ is represented as follows.

$$\Delta\varepsilon = \frac{\Delta\lambda m + \lambda 1 - \lambda 5}{a} \quad (11)$$

Accordingly, the reflected wavelength space $\lambda_1$-$\lambda_5$ is desirably as large as possible. In a case of $\lambda_1$-$\lambda_5$=$2\Delta\lambda_m$, the above expression yields $\Delta\epsilon=3\Delta\lambda_m/a$, and a strain that can be measured in the same measured wavelength range is maximum three times larger than a strain measured in the manner of the related art (FIG. 18).

Similarly, further increasing the number of overlappingly arranged FBGs can further increase the strain measurable range. Given that the number of overlappingly arranged FBGs is n, the difference between the longest reflected wavelength and the shortest reflected wavelength of the reflected wavelengths of the overlappingly arranged FBGs is less than or equal to $(n-1)/2$ times the measured wavelength range, and a strain that can be measured in the same measured wavelength range is maximum $(n+1)/2$ times larger than a strain measured in the manner of the related art.

Fifth Embodiment

The fifth embodiment sets the reflectance (reflection intensity) of each overlappingly arranged FBG to a different value and detects the measured wavelength range non-inclusion by identifying the reflected wavelength to which the measured peak wavelength corresponds. In order to realize this, a measured optical fiber 13E, in an OFDR device 1E according to the present embodiment, has a configuration in which a plurality of overlappingly arranged FBGs having different grating periods and reflectances is overlappingly written.

Figure 7:
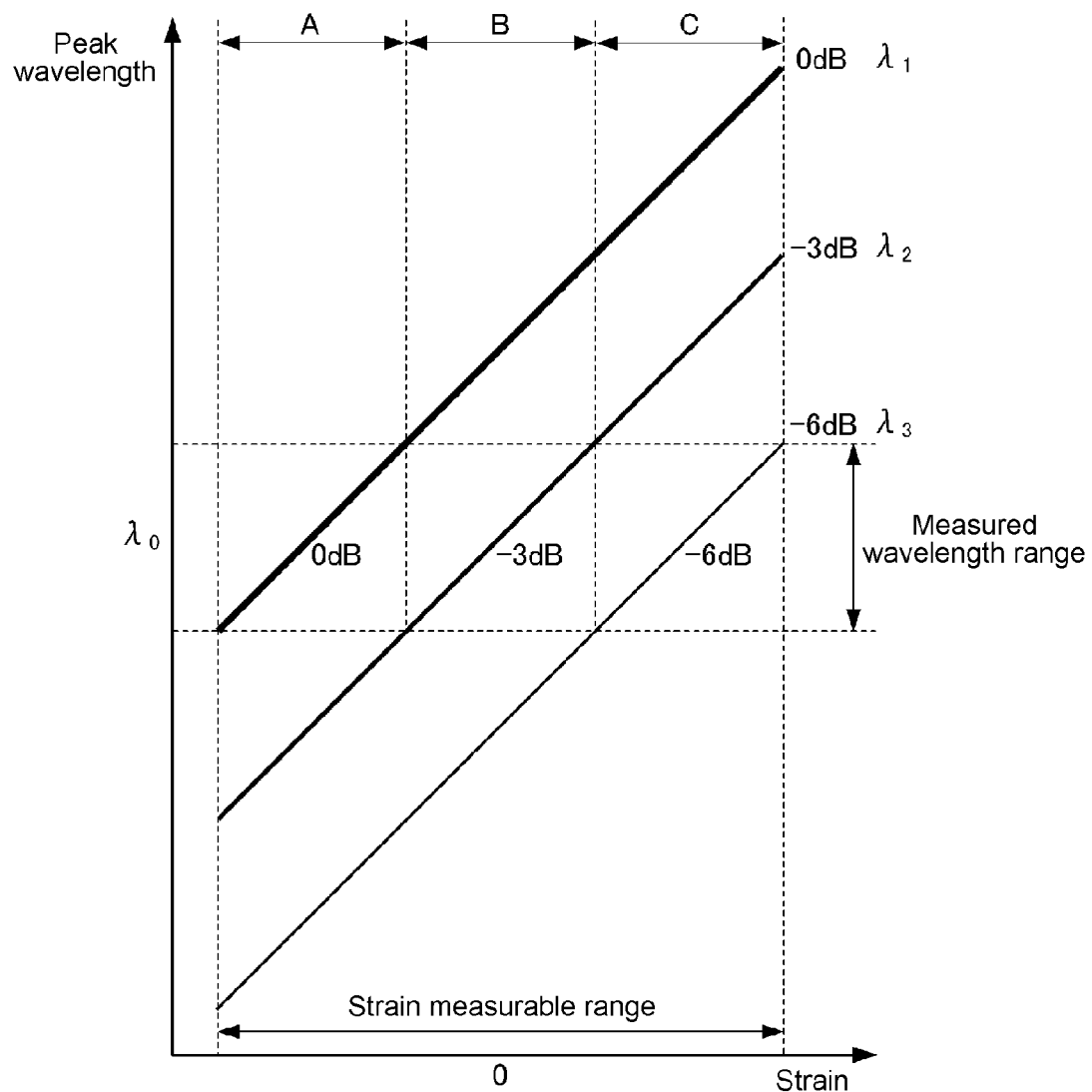
FIG. 7 is a graph illustrating a measured wavelength range non-inclusion detecting condition according to a fifth embodiment.

FIG. 7 is a graph illustrating a measured wavelength range non-inclusion detecting condition according to the fifth embodiment. This graph is based on relationship characteristics between a peak wavelength change and a strain of the measured optical fiber 13E in which three overlappingly arranged FBGs having different grating periods and reflectances are overlappingly written.

The reflected wavelengths of the overlappingly arranged FBGs are equidistant and are designated by reference signs $\lambda_1$, $\lambda_2$, and $\lambda_3$ in order from the long wavelength side in FIG. 7. The space $\lambda_1$-$\lambda_3$ between both end reflected wavelengths is equal to double the measured wavelength range, and the spaces $\lambda_1$-$\lambda_2$ and $\lambda_2$-$\lambda_3$ between the adjacent reflected wavelengths are set to the same value. In addition, the relative reflectances of the overlappingly arranged FBGs are set to 0, −13, and −6 decibels (dB) in order from the long wavelength side. Regarding the representation of the reflectance, a high reflectance is represented by a broad line, and a low reflectance is represented by a narrow line in FIG. 7.

When the measured optical fiber 13E including the three overlappingly arranged FBGs having different grating periods and reflectances is used, reflected light from the measured optical fiber 13E has three peaks that have different wavelengths and reflectances respectively corresponding to the three overlappingly arranged FBGs as illustrated in FIG. 7. If a strain is exerted on the measured optical fiber 13E, the three peak wavelengths change while almost maintaining the spaces between the peak wavelengths.

In the present embodiment that uses the measured optical fiber 13E, in FIG. 7, three regions (strain ranges) A, B, and C are defined regarding the strain measurable range represented by a horizontal axis, and one region is defined regarding the measured wavelength range represented by a vertical axis.

Then, if the reflected light from the measured optical fiber 13E that uses the overlappingly arranged FBGs of three wavelengths having different reflectances is observed, only $\lambda_1$ is measured in the region of the strain range A while $\lambda_2$ and $\lambda_3$ are not included in the measured wavelength range as illustrated in FIG. 7. In the region of the strain range B, only $\lambda_2$ is measured while $\lambda_1$ and $\lambda_3$ are not included in the measured wavelength range. In the region of the strain range C, only $\lambda_3$ is measured while $\lambda_1$ and $\lambda_2$ are not included in the measured wavelength range.

A measuring range non-inclusion detector 26E, in the OFDR device 1E according to the present embodiment, retains detecting condition data Dse in which the relationship characteristics among the strain of the measured optical fiber 13E, a peak wavelength change, and a reflectance (peak intensity) illustrated in FIG. 7 are associated with the strain ranges A to C and the measured wavelength range.

Accordingly, in the OFDR device 1E, the measuring range non-inclusion detector 26E, when obtaining the output of the peak wavelength detector 25, discriminates the reflectance of the peak wavelength, which is detected by the peak wavelength detector 25, of the reflected light from one overlappingly arranged FBG by referencing the detecting condition data Dse and, if the reflectance is 0 dB, determines that $\lambda_2$ and $\lambda_3$ are not included in the measured wavelength range (range A) and, if the reflectance is −3 dB, determines that $\lambda_1$ and $\lambda_3$ are not included in the measured wavelength range (range B) and, if the reflectance is −6 dB, determines that $\lambda_1$ and $\lambda_2$ are not included in the measured wavelength range (range C).

A peak wavelength corrector 27E, for example, when converting the peak wavelengths into the peak wavelength $\lambda_1$, outputs the measured peak wavelengths in the range A, outputs the measured peak wavelengths to which $\lambda_1-\lambda_2$ is added in the range B, and outputs the measured peak wavelengths to which $\lambda_1-\lambda_3$ is added in the range C. Similarly, conversion can be performed into $\lambda_2$, $\lambda_3$, or $(\lambda_1+\lambda_3)/2$. While the relative reflectances of the overlappingly arranged FBGs are set to 0 dB, −3 dB, and −6 dB in order from the long wavelength side, the relative reflectances of the overlappingly arranged FBGs may be set to −3 dB, 0 dB, and −6 dB in order from the long wavelength side in order to reduce measurement error in the region (range B) where the strain is small.

While FIG. 7 illustrates a case where $\lambda_1-\lambda_3$ is equal to double the measured wavelength range, this illustration is not for limitation purposes. The measured wavelength range non-inclusion can be detected if $\lambda_1-\lambda_3$ is less than or equal to double the measured wavelength range.

According to the method of the present embodiment in which the strain of the measured optical fiber 13E is measured by using the reflectances of three different wavelengths from three overlappingly arranged FBGs, the strain measurable range $\Delta\epsilon$ is represented as follows.

$$\Delta\varepsilon = \frac{\Delta\lambda m + \lambda 1 - \lambda 3}{a} \quad (12)$$

Accordingly, the reflected wavelength space $\lambda_1-\lambda_3$ is desirably as large as possible. In a case of $\lambda_1-\lambda_3=2\Delta\lambda_m$, the above expression yields $\Delta\epsilon=3\Delta\lambda_m/a$, and a strain that can be measured in the same measured wavelength range is maximum three times larger than a strain measured in the manner of the related art (FIG. 18).

The method of changing the reflectance of the overlappingly arranged FBG can be applied in the same manner to a case where the number of overlappingly arranged FBGs is other than three. Given that the number of overlappingly arranged FBGs is n, the difference between the longest reflected wavelength and the shortest reflected wavelength of the reflected wavelengths of the overlappingly arranged FBGs is less than or equal to (n−1) times the measured wavelength range, and a strain that can be measured in the same measured wavelength range is maximum n times larger than a strain measured in the manner of the related art.

In addition, a combined use of the method of changing the spaces between the reflected wavelengths of the overlappingly arranged FBGs and the method of changing the reflectances of the overlappingly arranged FBGs allows support of more reflected wavelengths or allows detection of the measured wavelength range non-inclusion to be performed more securely through redundancy.

Sixth Embodiment

The ranges A to C are determined by the intensity of the measured peak wavelength (peak intensity) in the fifth embodiment. However, if the measured optical fiber 13E is significantly bent, the peak intensity may be decreased by loss caused by the bending, and error may occur in the determination of the ranges A to C with the peak intensity. In such a case, it is desirable to measure a plurality of peaks in the measured wavelength range and determine the range by the intensity difference therebetween.

The sixth embodiment sets the reflectance (reflection intensity) of each overlappingly arranged FBG to a different value and detects the measured wavelength range non-inclusion by identifying the reflected wavelength to which the measured peak wavelength corresponds from the difference between the reflectances of the adjacent overlappingly arranged FBGs. In order to realize this, a measured optical fiber 13F, in an OFDR device 1F according to the sixth embodiment, has a configuration in which a plurality of overlappingly arranged FBGs having different grating periods and reflectances is overlappingly written. In addition, a measuring range non-inclusion detector 26F retains detecting condition data Dsf to detect the strain range by using the reflectance difference between the peak wavelengths of the overlappingly arranged FBGs.

Figure 8:
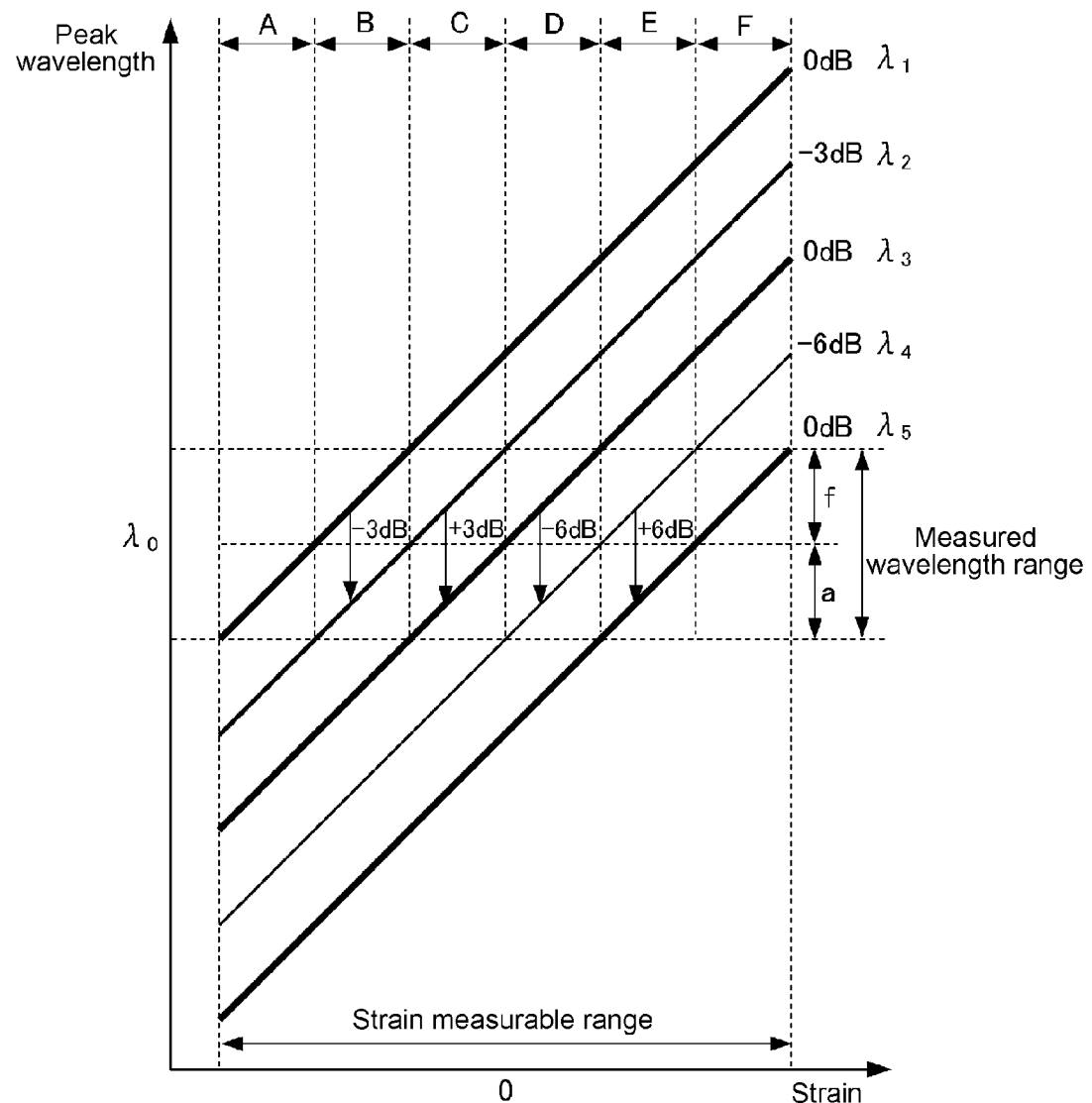
FIG. 8 is a graph illustrating a measured wavelength range non-inclusion detecting condition according to a sixth embodiment.

FIG. 8 is a graph illustrating a measured wavelength range non-inclusion detecting condition according to the sixth embodiment. This graph is particularly based on relationship characteristics between a peak wavelength change and a strain of the measured optical fiber 13F in which five overlappingly arranged FBGs having different grating periods and reflectances are overlappingly written.

The reflected wavelengths of the overlappingly arranged FBGs are equidistant and are designated by reference signs $\lambda_1, \lambda_2, \lambda_3, \lambda_4$, and $\lambda_5$ in order from the long wavelength side in FIG. 8. The space $\lambda_1-\lambda_5$ between both end reflected wavelengths is equal to double the measured wavelength range, and all of the spaces $\lambda_1-\lambda_2, \lambda_2-\lambda_3, \lambda_3-\lambda_4$, and $\lambda_4-\lambda_5$ between the adjacent reflected wavelengths are set to the same value. In addition, the relative reflectances of the overlappingly arranged FBGs are set to 0 dB, −3 dB, 0 dB, −6 dB, and 0 dB in order from the long wavelength side. Regarding the representation of the reflectance, a high reflectance is represented by a broad line, and a low reflectance is represented by a narrow line in FIG. 8.

When the measured optical fiber 13F including the five overlappingly arranged FBGs having different grating periods and reflectances is used, reflected light from the measured optical fiber 13F has five peaks that have different wavelengths and reflectances respectively corresponding to the five overlappingly arranged FBGs as illustrated in FIG. 8. If a strain is exerted on the measured optical fiber 13F, the five peak wavelengths change while almost maintaining the spaces between the peak wavelengths.

In the present embodiment that uses the measured optical fiber 13F, in FIG. 8, six regions (strain ranges) A, B, C, D, E, and F are defined regarding the strain measurable range represented by a horizontal axis, and two regions a and f are defined regarding the measured wavelength range represented by a vertical axis. In addition, the reflectance differences between the reflected wavelengths of the adjacent overlappingly arranged FBGs are defined as −3 dB, +3 dB, −6 dB, and +6 dB.

Then, if the reflected light from the measured optical fiber 13F that uses the five overlappingly arranged FBGs is observed, only $\lambda_1$ is measured in the region of the strain range A while $\lambda_2, \lambda_3, \lambda_4$, and $\lambda_5$ are not included in the measured wavelength range as illustrated in FIG. 8. In the region of the strain range B, $\lambda_1$ and $\lambda_2$ are measured while $\lambda_3, \lambda_4$, and $\lambda_5$ are not included in the measured wavelength range. In the region of the strain range C, $\lambda_2$ and $\lambda_3$ are measured while $\lambda_1, \lambda_4$, and $\lambda_5$ are not included in the measured wavelength range. In the region of the strain range D, $\lambda_3$ and $\lambda_4$ are measured while $\lambda_1, \lambda_2$, and $\lambda_5$ are not included in the measured wavelength range. In the region of the strain range E, $\lambda_4$ and $\lambda_5$ are measured while $\lambda_1, \lambda_2$, and $\lambda_3$ are not included in the measured wavelength range. In the region of the strain range F, only $\lambda_5$ is measured while $\lambda_1, \lambda_2, \lambda_3$, and $\lambda_4$ are not included in the measured wavelength range.

The measuring range non-inclusion detector 26F, in the OFDR device 1F according to the present embodiment, retains the detecting condition data Dsf in which the relationship characteristics between the strain of the measured optical fiber 13F and a peak wavelength change illustrated in FIG. 8 are associated with the strain ranges A to F, the regions a and f of the measured wavelength range, and the reflectance differences between the peak wavelengths of the adjacent overlappingly arranged FBGs.

Accordingly, in the OFDR device 1F according to the present embodiment, the measuring range non-inclusion detector 26F, when obtaining the output of the peak wavelength detector 25, first detects the number of peak wavelengths detected by the peak wavelength detector 25 by referencing the detecting condition data Dsf. If the number of peaks detected is one, the measuring range non-inclusion detector 26F determines that $\lambda_2, \lambda_3, \lambda_4$, and $\lambda_5$ are not included in the measured wavelength range (range A) when the peak is in the region a of the measured wavelength range and determines that $\lambda_1, \lambda_2, \lambda_3$, and $\lambda_4$ are not included in the measured wavelength range (range F) when the peak is in the region f of the measured wavelength range.

The measuring range non-inclusion detector 26F, if the number of peaks detected is two, determines that $\lambda_3, \lambda_4$, and $\lambda_5$ are not included in the measured wavelength range (range B) when the intensity of the short wavelength side peak with respect to the intensity of the long wavelength side peak is −3 dB, determines that $\lambda_1, \lambda_4$ and $\lambda_5$ are not included in the measured wavelength range (range C) when the intensity of the short wavelength side peak with respect to the intensity of the long wavelength side peak is +3 dB, determines that $\lambda_1, \lambda_2$, and $\lambda_5$ are not included in the measured wavelength range (range D) when the intensity of the short wavelength side peak with respect to the intensity of the long wavelength side peak is −6 dB, and determines that $\lambda_1, \lambda_2$, and $\lambda_3$ are not included in the measured wavelength range (range E) when the intensity of the short wavelength side peak with respect to the intensity of the long wavelength side peak is +6 dB.

A peak wavelength corrector 27F, for example, when converting the peak wavelengths into the peak wavelength $\lambda_1$, outputs the measured peak wavelengths in the range A, outputs the long wavelength side peak wavelength of the two measured peak wavelengths in the range B, outputs the short wavelength side (low intensity) peak wavelength of the two measured peak wavelengths to which $\lambda_1-\lambda_3$ is added in the range C, outputs the long wavelength side (high intensity) peak wavelength of the two measured peak wavelengths to which $\lambda_1-\lambda_3$ is added in the range D, outputs the short wavelength side (low intensity) peak wavelength of the two measured peak wavelengths to which $\lambda_1-\lambda_5$ is added in the range E, and outputs the measured peak wavelengths to which $\lambda_1-\lambda_5$ is added in the range F. Conversion may be performed by using any peak wavelength when two peak wavelengths are measured. However, using the higher intensity peak wavelength is desired from the viewpoint of wavelength measurement accuracy.

Similarly, conversion can be performed into $\lambda_2, \lambda_3, \lambda_4, \lambda_5$, or $(\lambda_1+\lambda_5)/2$. Conversion into $\lambda_1, \lambda_2, \lambda_3, \lambda_4, \lambda_5$, or $(\lambda_1+\lambda_5)/2$ may be performed by calculating the average value of the two measured peak wavelengths.

While FIG. 8 illustrates a case where $\lambda_1-\lambda_5$ is equal to double the measured wavelength range, this illustration is not for limitation purposes. The measured wavelength range non-inclusion can be detected if $\lambda_1-\lambda_5$ is less than or equal to double the measured wavelength range.

According to the method of the present embodiment in which the strain of the measured optical fiber 13F is measured by using reflectance differences between five different wavelengths of reflected light from five overlappingly arranged FBGs, the strain measurable range $\Delta\epsilon$ is represented as follows.

$$\Delta\varepsilon = \frac{\Delta\lambda m + \lambda 1 - \lambda 5}{a} \quad (13)$$

Accordingly, the reflected wavelength space $\lambda_1-\lambda_5$ is desirably as large as possible. In a case of $\lambda_1-\lambda_5=2\Delta\lambda_m$, the above expression yields $\Delta\epsilon=3\Delta\lambda_m/a$, and a strain that can be measured in the same measured wavelength range is maximum three times larger than a strain measured in the manner of the related art (FIG. 18).

The measuring method of the present embodiment in which the reflectance of the overlappingly arranged FBG is changed can also be applied in the same manner to a case where the number of reflected wavelengths is other than five, that is, to a configuration in which the number of overlappingly arranged FBGs used is other than five. Given that the number of overlappingly arranged FBGs is n, the difference between the longest reflected wavelength and the shortest reflected wavelength of the reflected wavelengths of the overlappingly arranged FBGs is less than or equal to (n−1)/2 times the measured wavelength range, and a strain that can be measured in the same measured wavelength range is maximum (n+1)/2 times larger than a strain measured in the manner of the related art. In addition, a combined use of the measuring method of changing the spaces between the reflected wavelengths of the overlappingly arranged FBGs and the measuring method of changing the reflectance differences between the overlappingly arranged FBGs allows support of more reflected wavelengths and allows detection of the measured wavelength range non-inclusion to be performed more securely through redundancy.

The extent to which the number of reflected wavelengths of the overlappingly arranged FBGs can be increased is determined by whether the reflected wavelengths of the overlappingly arranged FBGs can be separately detected even if the space therebetween is decreased and is dependent on spectrogram wavelength resolution. Since the number of reflected wavelengths of the overlappingly arranged FBGs is determined by the minimum reflected wavelength space in the measuring method of changing the spaces between the reflected wavelengths of the overlappingly arranged FBGs, the measuring method of changing the reflectance or the reflectance difference between the overlappingly arranged FBGs, because of having a constant reflected wavelength space, has the feature that increasing the number of reflected wavelengths is facilitated.

Seventh Embodiment

Further increasing the strain measurable range requires increasing the number of values of the wavelength spaces, the reflectances, and the reflectance differences respectively in the method of changing the wavelength spaces of the overlappingly arranged FBG according to the second to fourth embodiment, in the method of changing the reflectances of the overlappingly arranged FBG according to the fifth embodiment, and in the method of changing the reflectance differences of the overlappingly arranged FBG according to the sixth embodiment. Thus, a difficulty exists in discrimination from measured data. Therefore, hereinafter, a method of using a pseudorandom binary sequence will be described as a method for further increasing the strain measurable range without increasing the number of values.

Figure 9:
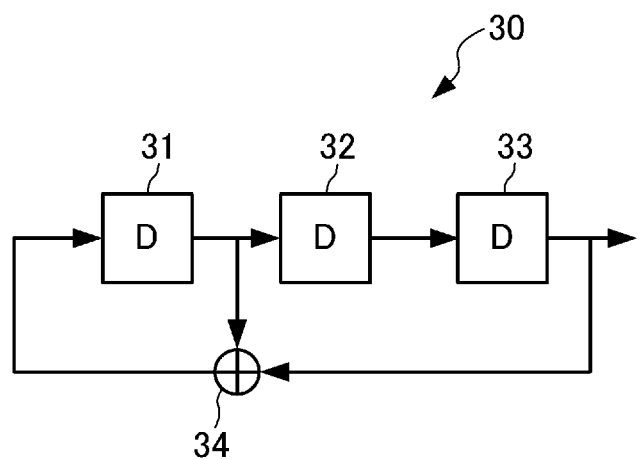
FIG. 9 is a block diagram illustrating a configuration of a pseudorandom binary sequence generator circuit according to a seventh embodiment.

A pseudorandom pattern (pseudorandom binary sequence or pseudorandom bit sequence, PRBS) is known as a bit pattern having a long period in the related art. FIG. 9 is a block diagram illustrating a configuration example of a PRBS generator circuit that generates a PRBS.

A PRBS generator circuit 30 illustrated in FIG. 9 is configured to include three registers 31, 32, and 33 and a one-bit adder 34 that adds the output of the register 31 to the output of the register 33 and inputs the addition result to register 31. The registers 31, 32, and 33 constitute a three-bit shift register, and the one-bit adder 34 is configured of an exclusive logical sum (XOR) gate. The PRBS generator circuit 30 is configured to set the initial value of the shift register to data in which at least one bit is one and to output a pseudorandom pattern by shifting the data in order of the registers 31, 32, and 33.

The three-stage PRBS generator circuit 30 illustrated in FIG. 9 repeatedly outputs a seven-bit period pattern having one period of 0011101 (001110100111010011101 . . . ). According to the configuration of the PRBS generator circuit 30, any position in the seven-bit period PRBS pattern is uniquely found by three-bit data. For example, three-bit data 100 only exists at the rightmost position in the PRBS pattern 001110100.

Regarding a PRBS generator circuit that uses a shift register and an XOR gate, a PRBS generator circuit of which the number of stages is other than three is also known. This type of PRBS generator circuit is not only configured of hardware using a shift register and an XOR gate but also can be realized by generating a PRBS pattern with software operations. Generally, an m-stage PRBS has a period of $2^m - 1$, and any position in a ($2^m - 1$)-bit period PRBS pattern is found by m-bit data.

Table 1 illustrates a relationship between the number of stages and the period of a PRBS pattern. As illustrated in Table 1, the value of ($2^m - 1$)/m increases as the number of stages of the PRBS pattern increases, and it can be understood that a position in a long period is found by data having a comparatively small number of bits. While Table 1 illustrates an example of m=10 or less, it is needless to say that there also exists a PRBS having more stages. The present embodiment increases the strain measurable range by changing the wavelength of the overlappingly arranged FBG on the basis of the PRBS pattern.

TABLE 1

| Number of Stages | Period | Period/Number of Stages |
|---|---|---|
| 2 | 3 | 1.50 |
| 3 | 7 | 2.33 |
| 4 | 15 | 3.75 |
| 5 | 31 | 6.20 |
| 6 | 63 | 10.50 |
| 7 | 127 | 18.14 |
| 8 | 255 | 31.88 |
| 9 | 511 | 56.78 |
| 10 | 1023 | 102.30 |

Figure 10:
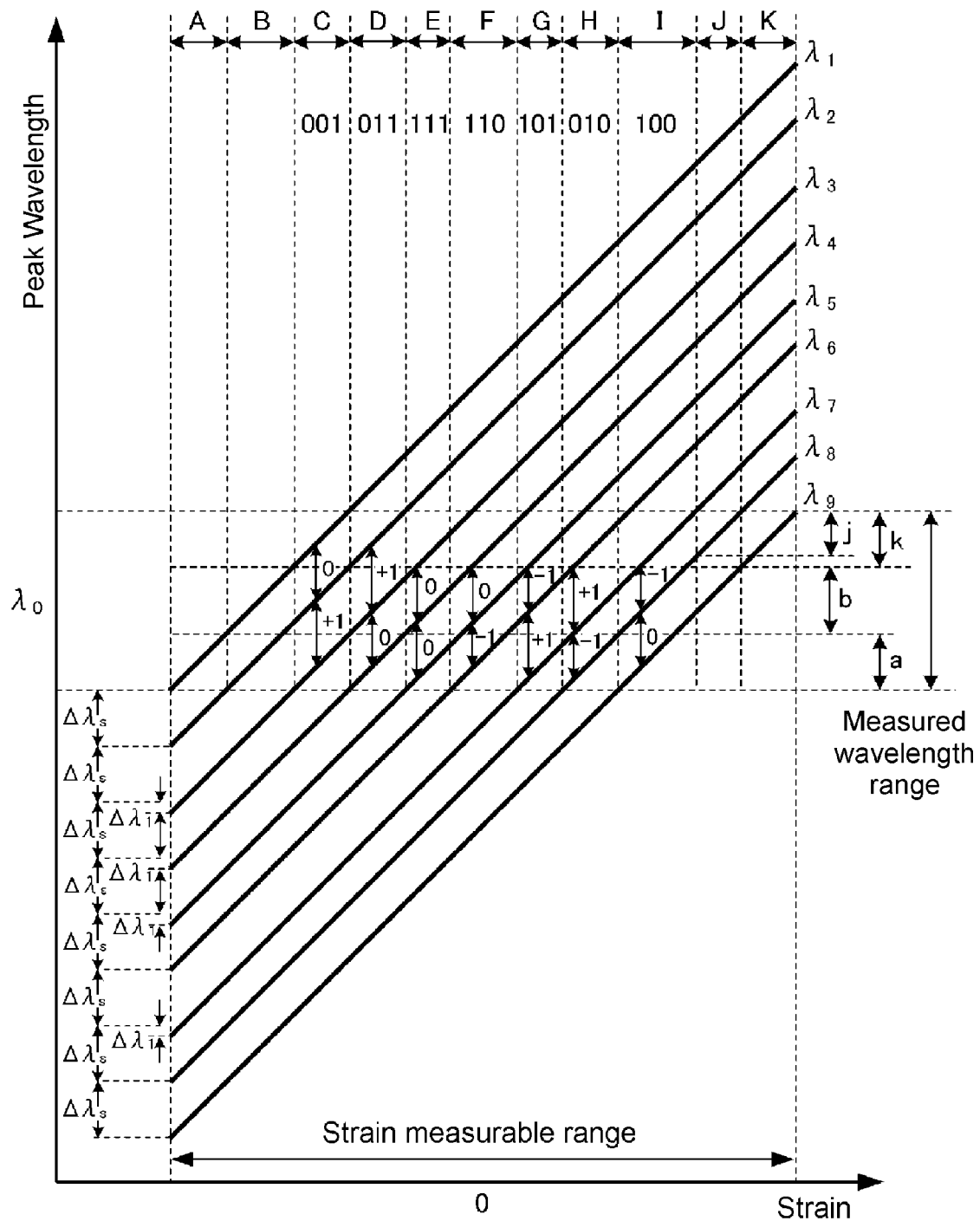
FIG. 10 is a graph illustrating a measured wavelength range non-inclusion detecting condition according to the seventh embodiment.

FIG. 10 is a graph illustrating a measured wavelength range non-inclusion detecting condition according to the seventh embodiment. This graph assumes that a measured optical fiber 13G is configured to include nine overlappingly arranged FBGs having different grating periods and is based on relationship characteristics between a strain of the measured optical fiber 13G and a peak wavelength change corresponding to the nine overlappingly arranged FBGs. Furthermore, parameters such as $\Delta\lambda_l$, $\Delta\lambda_s$, 0, +1, and −1 that are related to a process of changing a wavelength by the PRBS pattern are also set in FIG. 10.

The reflected wavelengths of the nine overlappingly arranged FBGs having different grating periods are designated by reference signs $\lambda_1$ to $\lambda_9$ in order from the long wavelength side in FIG. 10. Of these, $\lambda_1$, $\lambda_2$, $\lambda_6$, $\lambda_8$, and $\lambda_9$ are set in accordance with equidistant wavelength positions, and $\lambda_3$, $\lambda_4$, $\lambda_5$, and $\lambda_7$ are shifted to the short wavelength side from the equidistant wavelength positions. This is represented as the following expression.

$$\lambda_i = \begin{cases} \lambda s - i\Delta\lambda s, & b_i = 0 \\ \lambda s - i\Delta\lambda s - \Delta\lambda 1, & b_i = 1 \end{cases} \quad (14)$$

The symbol $\Delta\lambda_s$ is the space of the equidistant wavelength positions, the symbol $\Delta\lambda_1$ is the amount of shifts from the equidistant wavelength positions, and the relationship $\Delta\lambda_1 < \Delta\lambda_s$ is satisfied. The symbol $b_i$ represents the i-th bit of the PRBS. That is, given that the overlappingly arranged FBGs that are set to the equidistant wavelength positions are represented by 0 and that the overlappingly arranged FBGs that are set to shorter wavelengths than the equidistant wavelength positions are represented by 1, the peak wavelengths $\lambda_1$ to $\lambda_9$ form a three-stage PRBS pattern 001110100. While the peak wavelengths are set to the equidistant wavelength positions or shifted to the short wavelength side from the equidistant wavelength positions according to the PRBS pattern, the peak wavelengths may be shifted to the long wavelength side, or the amount of shifts from the equidistant wavelength positions may be changed according to the PRBS pattern. As a modification example, the three-stage PRBS may have a different phase of pattern.

As described above, when the measured optical fiber 13G including the nine overlappingly arranged FBGs is used, reflected light from the measured optical fiber 13G has nine peaks of different wavelengths as illustrated in FIG. 10. If a strain is exerted on the measured optical fiber 13G, the nine peak wavelengths change while almost maintaining the spaces between the peak wavelengths.

A principle of optical frequency domain reflectometry for such changing peak wavelengths according to the present embodiment will be described. In FIG. 10, ranges A to K, each having an appropriate width, are set in the direction of a horizontal axis that represents the amount of the strain of the measured optical fiber 13G, regions a, b, j, and k are set for the measured wavelength range in the direction of a vertical axis that represents the value of a peak wavelength, and furthermore, a rule (0, +1, −1) of changing the peak wavelengths on the basis of the PRBS pattern is set. Then, measurement can be performed as follows.

That is, in the present embodiment that is based on the settings illustrated in FIG. 10, only $\lambda_1$ is measured in the region of the strain range A while the others are not included in the measured wavelength range. In the region of the strain range B, $\lambda_1$ and $\lambda_2$ are measured while the others are not included in the measured wavelength range. In the region of the strain ranges C to I, at least three peak wavelengths are measured while the others are not included in the measured wavelength range. In the region of the strain range J, $\lambda_8$ and $\lambda_9$ are measured while the others are not included in the measured wavelength range. In the region of the strain range K, only $\lambda_9$ is measured while the others are not included in the measured wavelength range.

Therefore, a measuring range non-inclusion detector 26G, in an OFDR device 1G according to the present embodiment, can perform the following measured wavelength range non-inclusion detecting process by retaining detecting condition data Dsg that includes the relationship characteristics, the divided regions (strain ranges A to K), the regions a, b, j, and k of the measured wavelength range, the rule of changing the wavelengths on the basis of the PRBS pattern, and the like illustrated in FIG. 10.

That is, in the measured wavelength range non-inclusion detecting process, the measuring range non-inclusion detector 26G, when obtaining the output of the peak wavelength detector 25, first detects the number of peak wavelengths, which are detected by the peak wavelength detector 25, of the reflected light from the overlappingly arranged FBGs by referencing the detecting condition data Dsg.

Next, the measuring range non-inclusion detector 26G, if the number of peaks detected is one, determines that the peak is in the range A when the peak is in the region a of the measured wavelength range and determines that the peak is in the range K when the peak is in the region k of the measured wavelength range. If the number of peaks is two, the peaks are determined to be in the range B when the long wavelength side peak is in the region b of the measured wavelength range, and the peaks are determined to be in the range J when the long wavelength side peak is in the region j of the measured wavelength range.

The measuring range non-inclusion detector 26G, if the number of peaks is three or more, discriminates whether two peak spaces $\Delta\lambda_x$ measured on the short wavelength side are equal to the equidistant wavelength space ($\Delta\lambda_s - \Delta\lambda_1/2 \leq \Delta\lambda_x \leq \Delta\lambda_s + \Delta\lambda_1/2$), are a wavelength space that is larger than the equidistance ($\Delta\lambda_x > \Delta\lambda_s + \Delta\lambda_1/2$), or are a wavelength space that is smaller than the equidistance ($\Delta\lambda_x < \Delta\lambda_s - \Delta\lambda_1/2$) and respectively converts $\Delta\lambda_x$ into 0, +1, and −1.

In addition, the measuring range non-inclusion detector 26G, since the PRBS pattern does not have continuous zeros in number corresponding to the number of stages, converts the two peak spaces (0, 0) into 111, converts the peak space +1 into 01, converts the peak space −1 into 10, and converts the peak space 0 into the same value as the adjacent bit. That is, the two peak spaces (0, +1) are converted into 001, (+1, 0) are converted into 011, (0, 0) are converted into 111, (0, −1) are converted into 110, (−1, +1) are converted into 101, (+1, −1) are converted into 010, and (−1, 0) are converted into 100.

Next, the measuring range non-inclusion detector 26G determines that the three-bit pattern being 001 is the range C, determines that 011 is the range D, determines that 111 is the range E, determines that 110 is the range F, determines that 101 is the range G, determines that 010 is the range H, and determines that 100 is the range I. As such, the seven ranges C to I can be determined from the three-bit pattern by characteristics of the three-stage PRBS. Accordingly, one of the ranges A to K can be determined.

A peak wavelength corrector 27G, for example, when converting the peak wavelengths into the peak wavelength $\lambda_1$, outputs the measured peak wavelengths in the range A, outputs the long wavelength side peak wavelength of the measured peak wavelengths in the ranges B and C, outputs the third short wavelength side peak wavelength of the measured peak wavelengths to which $\lambda_1-\lambda_2$, $\lambda_1-\lambda_3$, ..., $\lambda_1-\lambda_7$ are added in the ranges D to I, and outputs the long wavelength side peak wavelength of the measured peak wavelengths to which $\lambda_1-\lambda_8$ and $\lambda_1-\lambda_9$ are added in the ranges J and K.

Similarly, conversion can be performed into $\lambda_2$ to $\lambda_9$ or $(\lambda_1+\lambda_9)/2$. While the peak wavelengths in number corresponding to the number of stages of the PRBS are measured, the range determination can be more securely performed by measuring the peak wavelengths in number greater than the number of stages of the PRBS. In addition, calculating the average value of the plurality of peak wavelengths measured can improve measurement accuracy in a region where the absolute value of a strain is small. In addition, increasing the number of stages of the PRBS lengthens the period of the PRBS, and the strain measurable range can be further increased by using a peak wavelength space having three values of $\Delta\lambda_s-\Delta\lambda_1$, $\Delta\lambda_s$, and $\Delta\lambda_s+\Delta\lambda_1$.

Eighth Embodiment

The eighth embodiment increases the strain measurable range by changing the wavelength space of the overlappingly arranged FBG on the basis of the PRBS pattern.

Figure 11:
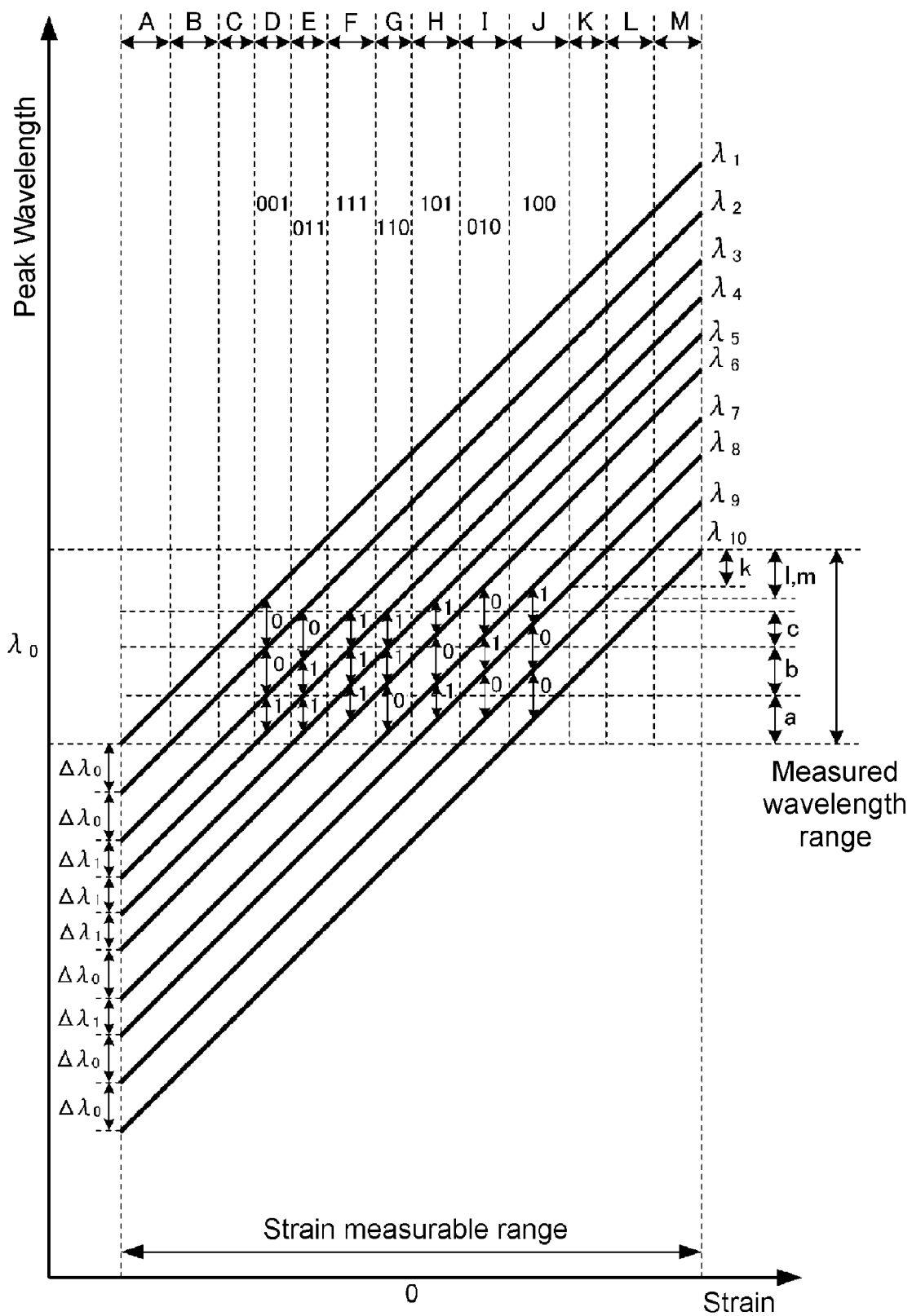
FIG. 11 is a graph illustrating a measured wavelength range non-inclusion detecting condition according to an eighth embodiment.

FIG. 11 is a graph illustrating a measured wavelength range non-inclusion detecting condition according to the eighth embodiment. This graph assumes that a measured optical fiber 13H is configured to include overlappingly arranged FBGs having different grating periods and is based on relationship characteristics between a strain of the measured optical fiber 13H and a peak wavelength change corresponding to the 10 overlappingly arranged FBGs. Furthermore, parameters such as $\Delta\lambda_0$, $\Delta\lambda_1$, 0, and 1 that are related to a process of changing the wavelength space by the PRBS pattern are also illustrated in FIG. 11.

The reflected wavelengths of the 10 overlappingly arranged FBGs having different grating periods are designated by reference signs $\lambda_1$ to $\lambda_{10}$ in order from the long wavelength side in FIG. 11. The spaces $\lambda_1-\lambda_2$, $\lambda_2-\lambda_3$, ..., and $\lambda_9-\lambda_{10}$ between the adjacent reflected wavelengths are set to either $\Delta\lambda_0$ or $\Delta\lambda_1$, where $\Delta\lambda_0\neq\Delta\lambda_1$. This is represented as the following expression.

$$\lambda_{i+1} = \begin{cases} \lambda_i - \Delta\lambda 0, & b_i = 0 \\ \lambda_i - \Delta\lambda 1, & b_i = 1 \end{cases} \quad (15)$$

The symbol $b_i$ represents the i-th bit of the PRBS. That is, given that the wavelength space $\Delta\lambda_0$ is represented as 0 and $\Delta\lambda_1$ as 1, the pattern forms the PRBS. For example, a pattern of 001110100 is illustrated as the three-stage PRBS. As a modification example, the three-stage PRBS may have a different phase of pattern.

As described above, when the measured optical fiber 13H including the 10 overlappingly arranged FBGs is used, reflected light from the measured optical fiber 13H has 10 peaks of different wavelengths as illustrated in FIG. 11. If a strain is exerted on the measured optical fiber 13H, the 10 peak wavelengths change while almost maintaining the spaces between the peak wavelengths.

A principle of optical frequency domain reflectometry for such changing peak wavelengths according to the present embodiment will be described. In FIG. 11, ranges A to M, each having an appropriate width, are set in the direction of a horizontal axis that represents the amount of the strain of the measured optical fiber 13H, regions a, b, c, l, m, and k are set for the measured wavelength range in the direction of a vertical axis that represents the value of a peak wavelength, and furthermore, a rule (0, 1) of changing the wavelength space between the peak wavelengths on the basis of the PRBS pattern is considered. Then, measurement can be performed as follows.

That is, in the present embodiment that is based on the settings illustrated in FIG. 11, only $\lambda_1$ is measured in the region of the strain range A while the others are not included in the measured wavelength range. In the region of the strain range B, $\lambda_1$ and $\lambda_2$ are measured while the others are not included in the measured wavelength range. In the region of the strain range C, $\lambda_1$, $\lambda_2$, and $\lambda_3$ are measured while the others are not included in the measured wavelength range. In the region of the strain ranges D to J, at least four peak wavelengths are measured while the others are not included in the measured wavelength range. In the region of the strain range K, $\lambda_8$, $\lambda_9$, and $\lambda_{10}$ are measured while the others are not included in the measured wavelength range. In the region of the strain range L, $\lambda_9$ and $\lambda_{10}$ are measured while the others are not included in the measured wavelength range. In the region of the strain range M, only $\lambda_{10}$ is measured while the others are not included in the measured wavelength range.

Therefore, a measuring range non-inclusion detector 26H, in an OFDR device 1H according to the present embodiment, can perform the following measured wavelength range non-inclusion detecting process by retaining detecting condition data Dsh that includes the relationship characteristics, the divided regions (strain ranges A to M), the regions a, b, c, l, m, and k of the measured wavelength range, the rule of changing the wavelength space on the basis of the PRBS pattern, and the like illustrated in FIG. 11.

That is, in the measured wavelength range non-inclusion detecting process, the measuring range non-inclusion detector 26H, when obtaining the output of the peak wavelength detector 25, first detects the number of peak wavelengths, which are detected by the peak wavelength detector 25, of the reflected light from the overlappingly arranged FBGs by referencing the detecting condition data Dsh.

Next, the measuring range non-inclusion detector 26H, if the number of peaks detected is one, determines that the peak is in the range A when the peak is in the region a of the measured wavelength range and determines that the peak is in the range M when the peak is in the region m of the measured wavelength range. If the number of peaks is two, the peaks are determined to be in the range B when the long wavelength side peak is in the region b of the measured wavelength range, and the peaks are determined to be in the range L when the long wavelength side peak is in the region l of the measured wavelength range. If the number of peaks is three, the peaks are determined to be in the range C when the long wavelength side peak is in the region c of the measured wavelength range, and the peaks are determined to be in the range K when the long wavelength side peak is in the region k of the measured wavelength range.

In addition, the measuring range non-inclusion detector 26H, if the number of peaks is four or more, discriminates whether three short wavelength side peak spaces are $\Delta\lambda_0$ or $\Delta\lambda_1$ (discriminates whether $\lambda_1-\lambda_{i+1}>(\Delta\lambda_0+\Delta\lambda_1)/2$ is established) and converts the three peak spaces into either 0 or 1. Then, the measuring range non-inclusion detector 26H determines that the pattern being 001 is the range D, determines that 011 is the range E, determines that 111 is the range F, determines that 110 is the range G, determines that 101 is the range H, determines that 010 is the range I, and determines that 100 is the range J. As such, the seven ranges D to J can be determined from three peak spaces by the characteristics of the three-stage PRBS. Accordingly, one of the ranges A to M can be determined.

A peak wavelength corrector 27H, for example, when converting the peak wavelengths into the peak wavelength $\lambda_1$, outputs the measured peak wavelengths in the range A, outputs the long wavelength side peak wavelength of the measured peak wavelengths in the ranges B, C, and D, outputs the fourth short wavelength side peak wavelength of the measured peak wavelengths to which $\lambda_1-\lambda_2$, $\lambda_1-\lambda_3$, ..., $\lambda_1-\lambda_7$ are added in the ranges E to J, and outputs the long wavelength side peak wavelength of the measured peak wavelengths to which $\lambda_1-\lambda_8$, $\lambda_1-\lambda_9$, and $\lambda_1-\lambda_{10}$ are added in the ranges K to M. Similarly, conversion can be performed into $\lambda_2$ to $\lambda_{10}$ or $(\lambda_1+\lambda_{10})/2$.

While the peak wavelength spaces in number corresponding to the number of stages of the PRBS are measured, the range determination can be more securely performed by measuring the peak wavelength spaces in number greater than the number of stages of the PRBS. In addition, calculating the average value of the plurality of peak wavelengths measured can improve measurement accuracy in a region where the absolute value of a strain is small. In addition, increasing the number of stages of the PRBS lengthens the period of the PRBS, and the strain measurable range can be further increased by using a peak wavelength space having two values of $\Delta\lambda_0$ and $\Delta\lambda_1$.

Ninth Embodiment

The reflectance of the overlappingly arranged FBG can be changed instead of the reflected wavelength space in the method using the PRBS. The ninth embodiment increases the strain measurable range by changing the reflectance of the overlappingly arranged FBG on the basis of the PRBS pattern.

Figure 12:
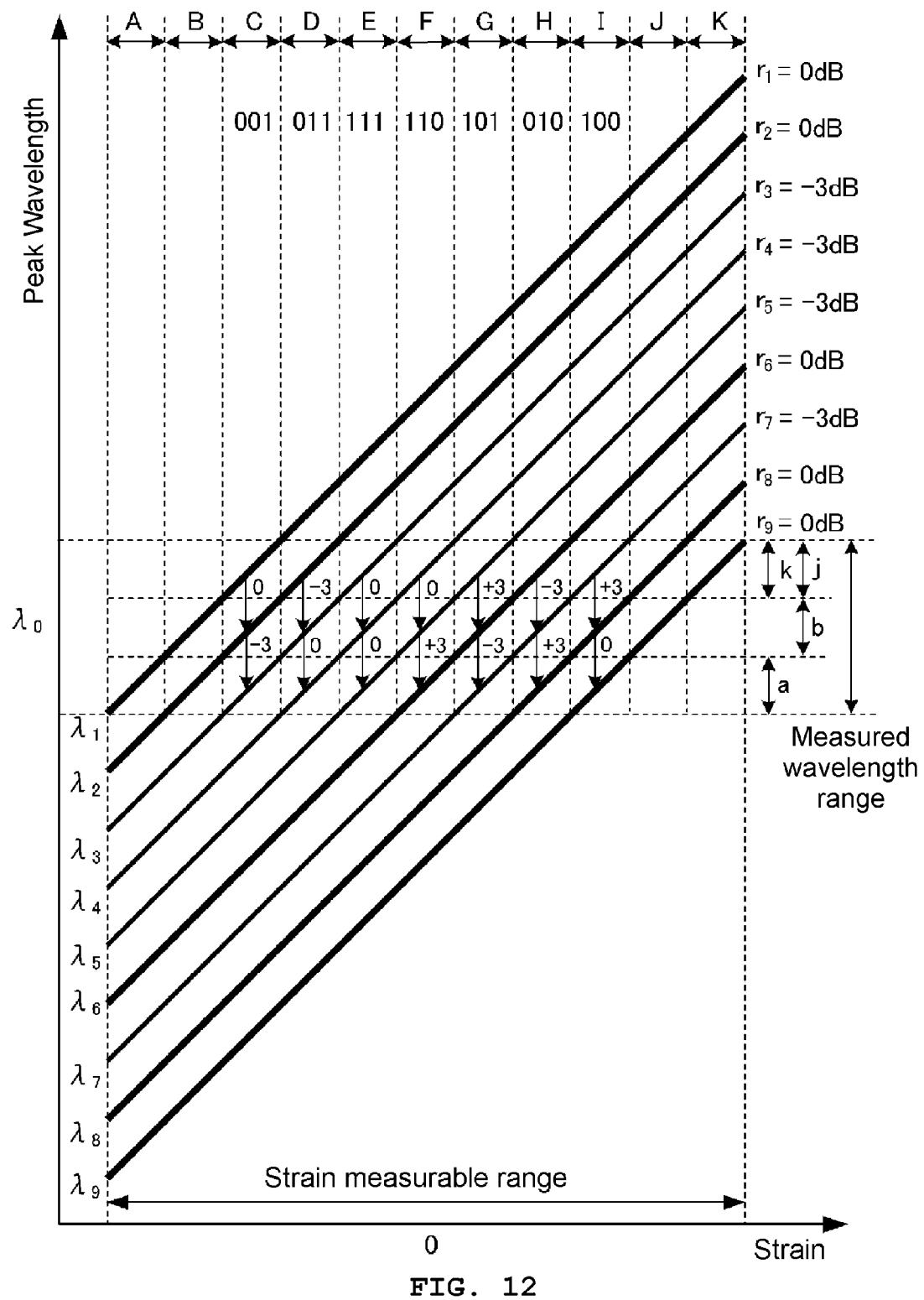
FIG. 12 is a graph illustrating a measured wavelength range non-inclusion detecting condition according to a ninth embodiment.

FIG. 12 is a graph illustrating a measured wavelength range non-inclusion detecting condition according to the ninth embodiment. This graph assumes that a measured optical fiber 13I is configured to include nine overlappingly arranged FBGs having different grating periods and is based on relationship characteristics between a strain of the measured optical fiber 13I and a peak wavelength change corresponding to the nine overlappingly arranged FBGs. Furthermore, the reflectance of each peak wavelength ($r_1$ to $r_9$) and parameters such as +3, 0, and −3 that are related to a process of changing the reflectance by the PRBS pattern are also set in FIG. 12.

The reflected wavelengths of the nine overlappingly arranged FBGs having different grating periods are designated by reference signs $\lambda_1$ to $\lambda_9$ in order from the long wavelength side, and the relative reflectances of these reflected wavelengths are designated by reference signs $r_1$, $r_2$, $r_3$, $r_4$, $r_5$, $r_6$, $r_7$, $r_8$, and $r_9$ (in units of dB) from the long wavelength side in FIG. 12. This is represented as the following expression.

$$r_i = \begin{cases} R0, & b_i = 0 \\ R1, & b_i = 1 \end{cases} \qquad (16)$$

The symbol $b_i$ represents the i-th bit of the PRBS, and the relationship R0>R1 is satisfied. The relative reflectances $r_2$, $r_3$, $r_4$, $r_5$, $r_6$, $r_7$, $r_8$, and $r_9$, for example, are set to 0 dB, 0 dB, −3 dB, −3 dB, −3 dB, 0 dB, −3 dB, 0 dB, and 0 dB as in FIG. 12. Given that the relative reflectance 0 dB is represented as 0 and −3 dB as 1, the pattern forms the PRBS. For example, a pattern of 001110100 is illustrated as the three-stage PRBS. The three-stage PRBS may have a different phase of pattern.

As described above, when the measured optical fiber 13I including the nine overlappingly arranged FBGs is used, reflected light from the measured optical fiber 13I has nine peaks of different wavelengths as illustrated in FIG. 12. If a strain is exerted on the measured optical fiber 13I, the nine peak wavelengths change while almost maintaining the spaces between the peak wavelengths.

A principle of optical frequency domain reflectometry for such changing peak wavelengths according to the present embodiment will be described. In FIG. 12, ranges A to K, each having an appropriate width, are set in the direction of a horizontal axis that represents the amount of the strain of the measured optical fiber 13I, regions a, b, j, and k are set for the measured wavelength range in the direction of a vertical axis that represents the value of a peak wavelength, and furthermore, a rule (−3, 0, +3) of changing the reflectance of the peak wavelength on the basis of the PRBS pattern is considered. Then, measurement can be performed as follows.

That is, in the present embodiment that is based on the settings illustrated in FIG. 12, only $\lambda_1$ is measured in the region of the strain range A while the others are not included in the measured wavelength range. In the region of the strain range B, $\lambda_1$ and $\lambda_2$ are measured while the others are not included in the measured wavelength range. In the region of the strain ranges C to I, three peak wavelengths are measured while the others are not included in the measured wavelength range. In the region of the strain range J, $\lambda_8$ and $\lambda_9$ are measured while the others are not included in the measured wavelength range. In the region of the strain range K, only $\lambda_9$ is measured while the others are not included in the measured wavelength range.

Therefore, a measuring range non-inclusion detector 26I, in an OFDR device 1I according to the present embodiment, can perform the following measured wavelength range non-inclusion detecting process by retaining detecting condition data Dsi that includes the relationship characteristics, the divided regions (strain ranges A to K), the regions a, b, j, and k of the measured wavelength range, the rule of changing the reflectance (peak intensity) on the basis of the PRBS pattern, and the like illustrated in FIG. 12.

That is, in the measured wavelength range non-inclusion detecting process, the measuring range non-inclusion detector 26I, when obtaining the output of the peak wavelength detector 25, first detects the number of peak wavelengths, which are detected by the peak wavelength detector 25, of the reflected light from the overlappingly arranged FBGs by referencing the detecting condition data Dsi.

Next, the measuring range non-inclusion detector 26I, if the number of peaks detected is one, determines that the peak is in the range A when the peak is in the region a of the measured wavelength range and determines that the peak is in the range K when the peak is in the region k of the measured wavelength range. If the number of peaks is two, the peaks are determined to be in the range B when the long wavelength side peak is in the region b of the measured wavelength range, and the peaks are determined to be in the range J when the long wavelength side peak is in the region j of the measured wavelength range.

The measuring range non-inclusion detector 26I, if the number of peaks is three, estimates the reflectance of the overlappingly arranged FBG from three peak intensities. While the reflectance of the overlappingly arranged FBG can be estimated by the absolute value of the peak intensity, the peak intensity may be decreased by loss that is caused by bending of the measured optical fiber 13I. Therefore, it is desirable to detect the peak intensity difference (difference in units of dB).

The measuring range non-inclusion detector 26I, in the estimation process, discriminates whether two peak intensity differences $\Delta r_x$ are zero (($R1-R0$)/2≤$\Delta r_x$≤($R0-R1$)/2), are positive ($\Delta r_x$>($R0-R1$)/2), or are negative ($\Delta r_x$<($R1-R0$)/2) and respectively converts $\Delta r_x$ into 0, +3, and −3. Since the PRBS does not have continuous zeros in number corresponding to the number of stages, the two peak intensity differences (0, 0) are converted into 111, the peak intensity difference −3 is converted into 01, the peak intensity difference +3 is converted into 10, and the peak intensity difference 0 is converted into the same value as the adjacent bit.

That is, the measuring range non-inclusion detector 26I converts the two peak intensity differences (0, −3) into 001, converts (−3, 0) into 011, converts (0, 0) into 111, converts (0, +3) into 110, converts (+3, −3) into 101, converts (−3, +3) into 010, and converts (+3, 0) into 100.

Next, the measuring range non-inclusion detector 26I determines that the three-bit pattern being 001 is the range C, determines that 011 is the range D, determines that 111 is the range E, determines that 110 is the range F, determines that 101 is the range G, determines that 010 is the range H, and determines that 100 is the range I. As such, the seven ranges C to I can be identified from a pattern of three reflectances by the characteristics of the three-stage PRBS. Accordingly, one of the ranges A to K can be determined.

A peak wavelength corrector 27I, for example, when converting the peak wavelengths into the peak wavelength $\lambda_1$, outputs the measured peak wavelengths in the range A, outputs the long wavelength side peak wavelength of the measured peak wavelengths in the ranges B and C, outputs the long wavelength side peak wavelength of the measured peak wavelengths to which $\lambda_1-\lambda_2, \lambda_1-\lambda_3, \ldots,$ and $\lambda_1-\lambda_8$ are added in the ranges D to J, and outputs the measured peak wavelengths to which $\lambda_1-\lambda_9$ is added in the range K.

Similarly, conversion can be performed into $\lambda_2$ to $\lambda_9$ or $(\lambda_1+\lambda_9)/2$. In addition, measurement accuracy can be improved by employing a peak wavelength of a high reflectance, by calculating the average value of the plurality of peak wavelengths measured, or by weighting the plurality of peak wavelengths according to the reflectance and calculating the average value thereof. In addition, increasing the number of stages of the PRBS lengthens the period of the PRBS, and the strain measurable range can be further increased by using a reflectance difference having three values of R1−R0, 0, and R0−R1.

Tenth Embodiment

The tenth embodiment increases the strain measurable range by changing the reflectance difference between the overlappingly arranged FBGs on the basis of the PRBS pattern.

Figure 13:
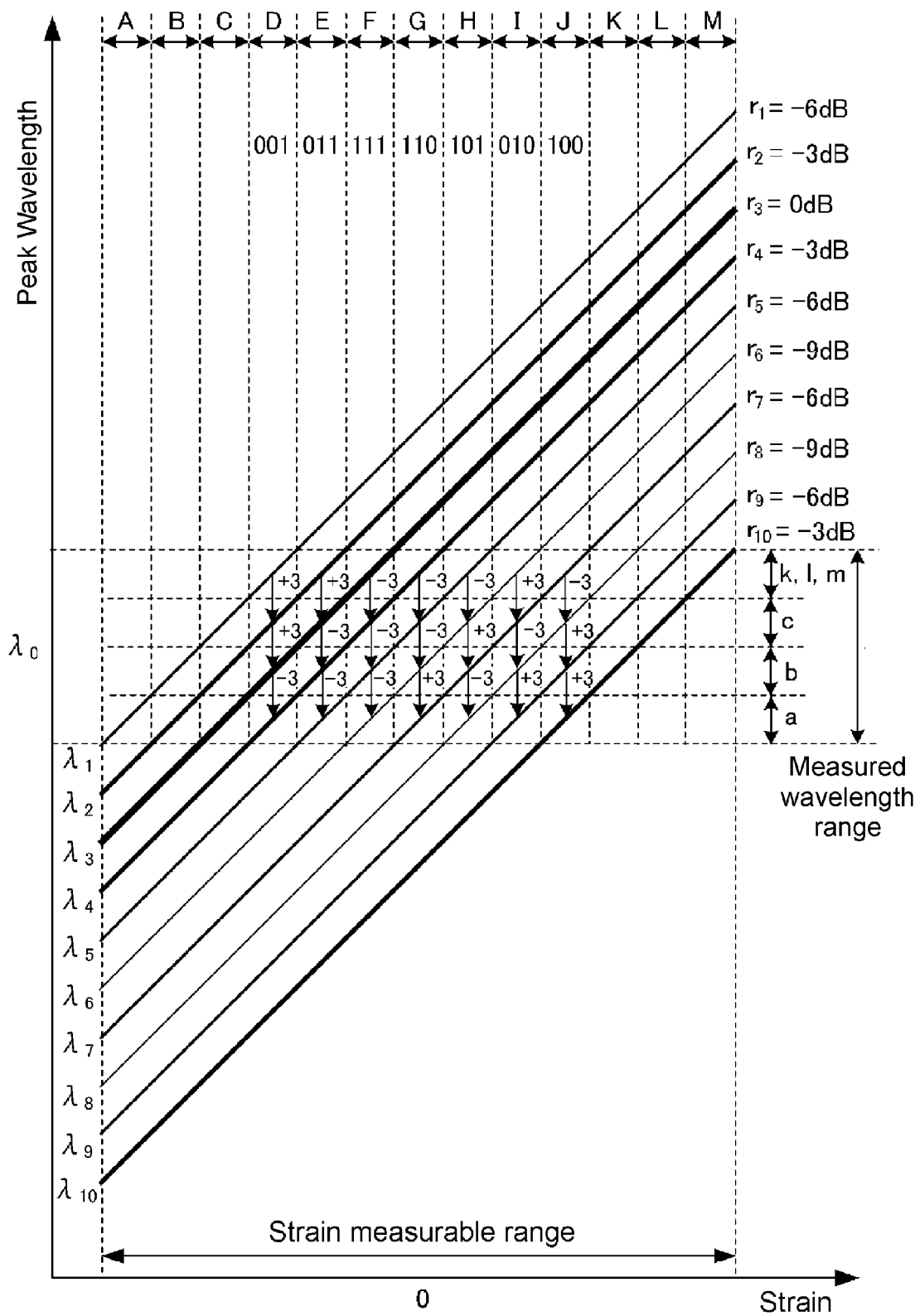
FIG. 13 is a graph illustrating a measured wavelength range non-inclusion detecting condition according to a tenth embodiment.

FIG. 13 is a graph illustrating a measured wavelength range non-inclusion detecting condition according to the tenth embodiment. This graph assumes that a measured optical fiber 13J is configured to include, for example, 10 overlappingly arranged FBGs having different grating periods and is based on relationship characteristics between a strain of the measured optical fiber 13J and a peak wavelength change corresponding to the 10 overlappingly arranged FBGs. Furthermore, the reflectance of each peak wavelength ($r_1$ to $r_{10}$) and parameters for the reflectance difference therebetween that are related to a process of changing the reflectance difference by the PRBS pattern are also illustrated in FIG. 13.

The reflected wavelengths of the 10 overlappingly arranged FBGs having different grating periods are designated by reference signs $\lambda_1$ to $\lambda_{10}$ in order from the long wavelength side, and the relative reflectances of these reflected wavelengths are designated by reference signs $r_1$, $r_2, r_3, r_4, r_5, r_6, r_7, r_8, r_9$, and $r_{10}$ (in units of dB) from the long wavelength side in FIG. 13. In addition, the reflectance difference between the adjacent reflected wavelengths is set to either ΔR0 or ΔR1. This is represented as the following expression.

$$r_{i+1} = \begin{cases} r_i + \Delta R0, & b_i = 0 \\ r_i + \Delta R1, & b_i = 1 \end{cases} \quad (17)$$

The symbol $b_i$ represents the i-th bit of the PRBS, and the relationship ΔR0>ΔR1 is satisfied. Given that the relative reflectances $r_1, r_2, r_3, r_4, r_5, r_6, r_7, r_8, r_9$, and $r_{10}$ of the overlappingly arranged FBGs are, for example, as illustrated in FIG. 13, −6 dB, −3 dB, 0 dB, −3 dB, −6 dB, −9 dB, −6 dB, −9 dB, −6 dB, and −3 dB, the reflectance differences between the adjacent reflected wavelengths are +3 dB, +3 dB, −3 dB, −3 dB, −3 dB, +3 dB, −3 dB, +3 dB, and +3 dB. Associating the reflectance difference +3 dB with 0 and −3 dB with 1 forms a three-stage PRBS pattern of 001110100. The three-stage PRBS may have a different phase of pattern.

As described above, when the measured optical fiber 13J including the 10 overlappingly arranged FBGs is used, reflected light from the measured optical fiber 13J has 10 peaks of different wavelengths as illustrated in FIG. 13. If a strain is exerted on the measured optical fiber 13J, the 10 peak wavelengths change while almost maintaining the spaces between the peak wavelengths.

A principle of optical frequency domain reflectometry for such changing peak wavelengths according to the present embodiment will be described. In FIG. 13, ranges A to M, each having an appropriate width, are set in the direction of a horizontal axis that represents the amount of the strain of the measured optical fiber 13J, regions a, b, c, k, l, and m are set for the measured wavelength range in the direction of a vertical axis that represents the value of a peak wavelength, and furthermore, a rule (+3, −3, $r_1$ to $r_{10}$) of changing the reflectance difference between the peak wavelengths on the basis of the PRBS pattern is considered. Then, measurement can be performed as follows.

That is, in the present embodiment that is based on the settings illustrated in FIG. 13, only $\lambda_1$ is measured in the region of the strain range A while the others are not included in the measured wavelength range. In the region of the strain range B, $\lambda_1$ and $\lambda_2$ are measured while the others are not included in the measured wavelength range. In the region of the strain range C, $\lambda_1, \lambda_2,$ and $\lambda_3$ are measured while the others are not included in the measured wavelength range. In the region of the strain ranges D to J, four peak wavelengths are measured while the others are not included in the measured wavelength range. In the region of the strain range K, $\lambda_8, \lambda_9,$ and $\lambda_{10}$ are measured while the others are not included in the measured wavelength range. In the region of the strain range L, $\lambda_9$ and $\lambda_{10}$ are measured while the others are not included in the measured wavelength range. In the region of the strain range M, only $\lambda_{10}$ is measured while the others are not included in the measured wavelength range.

Therefore, a measuring range non-inclusion detector 26J, in an OFDR device 1J according to the present embodiment, can perform the following measured wavelength range non-inclusion detecting process by retaining detecting condition data Dsj that includes the relationship characteristics, the divided regions (strain ranges A to M), the regions a, b, c, k, l, and m of the measured wavelength range, the rule of changing the reflectance difference on the basis of the PRBS pattern, and the like illustrated in FIG. 13.

That is, in the measured wavelength range non-inclusion detecting process, the measuring range non-inclusion detector 26J, when obtaining the output of the peak wavelength detector 25, first detects the number of peak wavelengths, which are detected by the peak wavelength detector 25, of the reflected light from the overlappingly arranged FBGs by referencing the detecting condition data Dsj.

Next, the measuring range non-inclusion detector 26J, if the number of peaks detected is one, determines that the peak is in the range A when the peak is in the region a of the measured wavelength range and determines that the peak is in the range M when the peak is in the region m of the measured wavelength range. If the number of peaks is two, the peaks are determined to be in the range B when the long wavelength side peak is in the region b of the measured wavelength range, and the peaks are determined to be in the range L when the long wavelength side peak is in the region l of the measured wavelength range. If the number of peaks is three, the peaks are determined to be in the range C when the most long wavelength side peak is in the region c of the measured wavelength range, and the peaks are determined to be in the range K when the most long wavelength side peak is in the region k of the measured wavelength range.

The measuring range non-inclusion detector 26J, if the number of peaks is four, estimates the reflectance of the overlappingly arranged FBG from the peak intensity difference between the adjacent wavelengths. While the reflectance of the overlappingly arranged FBG can be estimated by the absolute value of the peak intensity, the peak intensity may be decreased by loss that is caused by bending of the measured optical fiber 13J. Therefore, it is desirable to detect the peak intensity difference (difference in units of dB).

Specifically, the measuring range non-inclusion detector 26J discriminates whether three peak intensity differences $\Delta r_x$ are $\Delta R0$ or $\Delta R1$ (discriminates whether $\Delta r_x > (\Delta R0 + \Delta R1)/2$ is established) and converts the three peak intensity differences $\Delta r_x$ into either 0 or 1. Then, the measuring range non-inclusion detector 26J determines that the pattern being 001 is the range D, determines that 011 is the range E, determines that 111 is the range F, determines that 110 is the range G, determines that 101 is the range H, determines that 010 is the range I, and determines that 100 is the range J. As such, the seven ranges D to J can be identified from a pattern of three reflectance differences by the characteristics of the three-stage PRBS. Accordingly, one of the ranges A to M can be determined.

A peak wavelength corrector 27J, for example, when converting the peak wavelengths into the peak wavelength $\lambda_1$, outputs the measured peak wavelengths in the range A, outputs the long wavelength side peak wavelength of the measured peak wavelengths in the ranges B to D, outputs the long wavelength side peak wavelength of the measured peak wavelengths to which $\lambda_1-\lambda_2$, $\lambda_1-\lambda_3$, . . . , and $\lambda_1-\lambda_9$ are added in the ranges E to L, and outputs the measured peak wavelengths to which $\lambda_1-\lambda_{10}$ is added in the range M.

Similarly, conversion can be performed into $\lambda_2$ to $\lambda_{10}$ or $(\lambda_1+\lambda_{10})/2$. In addition, measurement accuracy can be improved by employing a peak wavelength of a high reflectance, by calculating the average value of the plurality of peak wavelengths measured, or by weighting the plurality of peak wavelengths according to the reflectance and calculating the average value thereof. In addition, increasing the number of stages of the PRBS lengthens the period of the PRBS, and the strain measurable range can be further increased by using a reflectance difference having two values of $\Delta R0$ and $\Delta R1$.

The number of stages of the PRBS is not limited to three in any of the methods of forming the PRBS pattern from the reflected wavelength, the reflected wavelength space, and the reflectance difference described in the seventh, eighth, and ninth embodiments in addition to the method of forming the PRBS pattern from the reflectance difference as in the present embodiment. Increasing the number of stages lengths the period of the PRBS pattern and increases period÷number of stages. Thus, the strain measurable range can be significantly increased with a nearly small increase in the measured wavelength range.

It is not necessary to use the entire period of the PRBS. Only a part of the period of the PRBS may be used if necessary. The extent to which the number of stages of the PRBS can be increased is determined by whether the reflected wavelengths of the overlappingly arranged FBGs can be separately detected even if the space therebetween is decreased and is dependent on the spectrogram wavelength resolution. Since the number of reflected wavelengths of the overlappingly arranged FBGs is determined by the minimum reflected wavelength space in the method of changing the reflected wavelengths or the spaces between the reflected wavelengths of the overlappingly arranged FBGs, the method of changing the reflectance or the reflectance difference between the overlappingly arranged FBGs, because of having a constant reflected wavelength space, has the feature that increasing the number of stages of the PRBS is facilitated.

While a strain is measured by detecting the reflected wavelength even in a region near both ends of the strain measurable range where the number of reflected wavelengths is small in each of the embodiments, the process of detecting the number of peaks can be omitted by not using the region where the number of reflected wavelengths is small. While the strain measurable range is decreased when the region where the number of reflected wavelengths is small is not used, increasing the number of stages of the PRBS lengthens the period of the PRBS pattern as described above in the method using the PRBS. Thus, the strain measurable range can be easily increased.

While the optical splitter/combiner 12 is configured of, for example, an optical coupler that causes the output light from the swept light source 11 to branch into two and then combines input of the reflected light from the measured optical fiber 13 and part of the output light from the swept light source 11 reflected by the reference light optical fiber 14 in the OFDR device 1 illustrated in FIG. 1, this type of optical splitting/combining mechanism is not limited to the optical coupler.

Figure 14:
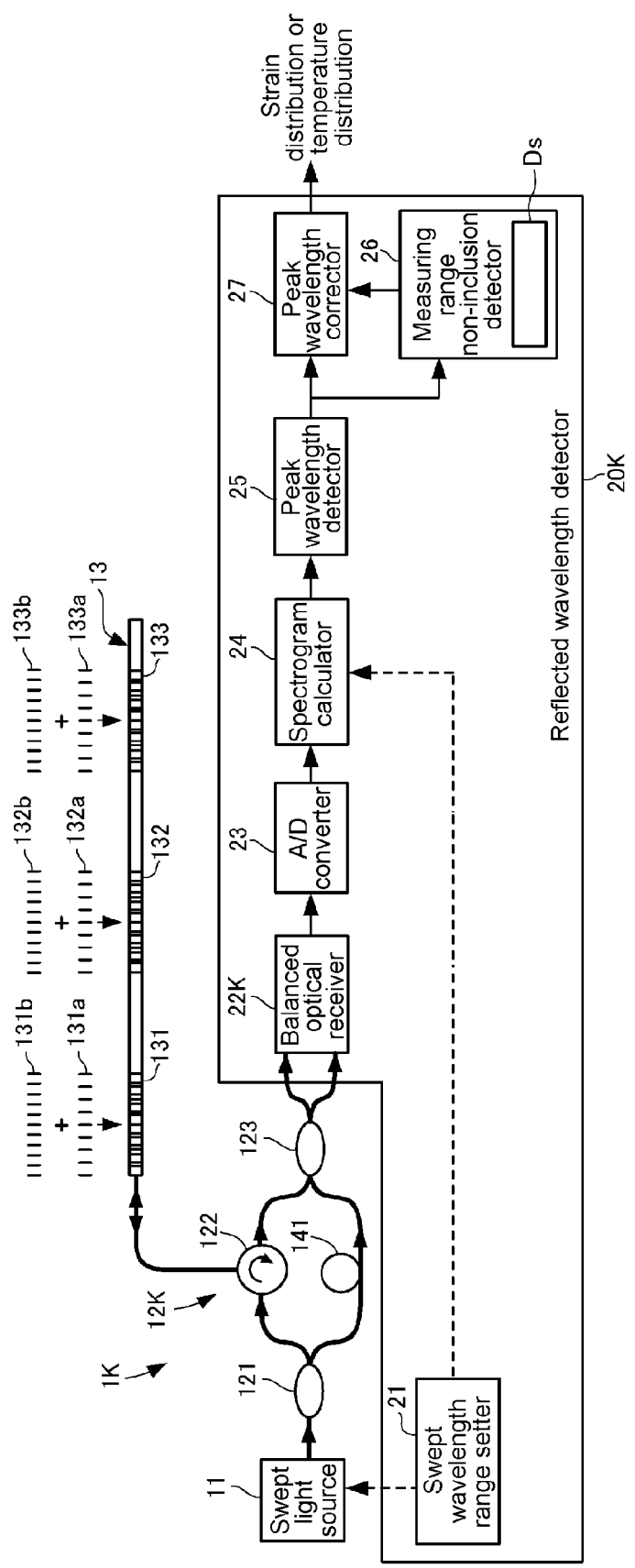
FIG. 14 is a diagram illustrating a configuration of an OFDR device according to a modification example of the present invention.

FIG. 14 is a block diagram illustrating a configuration of an OFDR device 1K according to a modification example of the present invention. This OFDR device 1K results from replacing the optical splitter/combiner 12 and the optical receiver 22 of the OFDR device 1 illustrated in FIG. 1 respectively with an optical splitter/combiner 12K and a balanced optical receiver 22K. Other configurations are the same as the OFDR device 1.

As illustrated in FIG. 14, the optical splitter/combiner 12K is configured of a first optical coupler 121, an optical circulator 122, and a second optical coupler 123 in the OFDR device 1K. A delay fiber 141 is disposed on the optical path between the first optical coupler 121 and the second optical coupler 123. The balanced optical receiver 22K that receives combined output light of the reflected light from the measured optical fiber 13 and the output light from the swept light source 11 through the delay fiber 141 is disposed in a reflected wavelength detector 20K.

The output light from the swept light source 11 branches into two by the first optical coupler 121 of the optical splitter/combiner 12K in the OFDR device 1K. One branch is input to a first terminal of the optical circulator 122 and then is output from a second terminal of the optical circulator 122 and guided to the measured optical fiber 13. The reflected light from the measured optical fiber 13 is input to the second terminal of the optical circulator 122 and then is output from a third terminal of the optical circulator 122.

The reflected light from the measured optical fiber 13 and the other branch (reference light) of light that branches by the first optical coupler 121 are input to the second optical coupler 123 and are combined and interfere with each other. The delay fiber 141 is inserted so that the path length of the reference light from branching by the first optical coupler 121 until combining by the second optical coupler 123 is less than or equal to the path length of light from branching by the first optical coupler 121 via reflection by the near end of the measured optical fiber 13 until combining by the second optical coupler 123 or greater than or equal to the path length of light from branching by the first optical coupler 121 via reflection by the far end of the measured optical fiber 13 until combining by the second optical coupler 123.

Two types of light output from the optical coupler 123 have phases opposite to each other when interfering. These two types of light are input to the balanced optical receiver 22K, and a beat signal from the interference of the reference light and the reflected light from the measured optical fiber 13 is detected. The balanced reception doubles the amplitude of the beat signal from interference. Noise of the same phase included in the two types of light is canceled, and the amplitude of random noise is increased √2 times. Thus, the signal-to-noise ratio is improved.

In order to avoid the problem that an interference signal is not obtained by orthogonal polarization of the reference light and the reflected light from the measured optical fiber 13, the polarization may be adjusted by inserting a polarization controller, not illustrated, on at least one of the measured optical fiber 13 side and the reference light side, or polarization diversity reception that detects each of two orthogonal polarized components of the reflected light from the measured optical fiber may be used.

Other configurations including the A/D converter 23 in the reflected wavelength detector 20K of the OFDR device 1K are the same as in FIG. 1. The OFDR device 1K detects the beat signal from interference of the reference light and the reflected light from the measured optical fiber 13 in the same manner as the configuration of the OFDR device 1 (refer to FIG. 1). The OFDR methods illustrated in the first to tenth embodiments (refer to FIG. 3 to FIG. 13) can be applied in the same manner after the spectrogram of the beat signal is calculated.

The overlappingly arranged FBGs 131a, 131b, . . . included in the measured optical fiber 13 used in each embodiment of the present invention have properties in which each peak wavelength changes in response to not only a strain of the optical fiber but also a temperature change while almost maintaining a space therebetween.

Therefore, it is also possible that the OFDR devices 1 to 1K and the methods according to the modification example of the present invention employ the measured optical fiber 13 including the plurality of overlappingly arranged FBGs 131a, 131b, . . . of different reflected wavelengths, each peak wavelength of which changes in response to a temperature change in the optical fiber while almost maintaining a space therebetween. The measuring range non-inclusion detector 26 detects a temperature change range, including the temperature of the measured optical fiber 13 in each differential distance interval, from the reflected wavelengths of the overlappingly arranged FBGs, detected by the peak wavelength detector 25 within the measured wavelength range, on the basis of detecting condition data (Ds) that indicates characteristics of a peak wavelength change in each of the overlappingly arranged FBGs 131a, 131b, . . . with respect to a temperature change in the measured optical fiber 13, the data including a predetermined measured wavelength range that is set in the direction of a peak wavelength axis and a plurality of continuous temperature change ranges that are set in the direction of a temperature change axis. A temperature distribution of the measured optical fiber 13 can be measured on the basis of the result of detection of the temperature change range and of the reflected wavelengths of the overlappingly arranged FBGs within the measured wavelength range performed by the measuring range non-inclusion detector 26.

Besides, various modifications can be carried out to the present invention within the scope disclosed in the claims.

DESCRIPTION OF REFERENCE NUMERALS AND SIGNS 1, 1K OFDR device
11 Swept light source
12, 12K Optical splitter/combiner
13 Measured optical fiber
131, 132, 133 Fiber Bragg grating (FBG)
131a, 131b Overlappingly arranged FBG
132a, 132b Overlappingly arranged FBG
133a, 133b Overlappingly arranged FBG
14 Reference light optical fiber
14a Reflecting coat (reflecting face)
20, 20K Reflected wavelength detector
21 Swept wavelength range setter
22 Optical receiver
22K Balanced optical receiver
23 A/D converter
24 Spectrogram calculator
25 Peak wavelength detector
26 Measuring range non-inclusion detector
27 Peak wavelength corrector

What is claimed is:

1. An OFDR device that measures a strain distribution or a temperature distribution of a measured optical fiber, the device comprising:
  a light source that outputs wavelength-swept light;
  a measured optical fiber that includes a fiber Bragg grating unit;
  an optical splitter/combiner that inputs part of output light from the light source to the measured optical fiber and combines reflected light from the measured optical fiber and part of output light from the light source;
  an optical receiver that converts light from the optical splitter/combiner into an electrical signal;
  an A/D converter that converts the electrical signal into a digital signal;
  a spectrogram calculator that calculates a spectrogram by performing discrete Fourier transform on the digital signal; and
  a peak wavelength detector that detects one or more peak wavelengths of the spectrogram on a wavelength axis,
  wherein the fiber Bragg grating unit includes a plurality of gratings that is overlappingly formed in order to reflect a plurality of different wavelengths,
  the OFDR device further includes a measuring range non-inclusion detector that detects gratings of the plurality of gratings of which the reflected wavelengths are not included in a predetermined measured wavelength range from the peak wavelengths detected by the peak wavelength detector based on measured wavelength range non-inclusion detecting condition data (Ds)

which have the measured wavelength range toward the wavelength axis of the peak wavelengths, and a strain or temperature detector that measures a strain distribution or a temperature distribution of the measured optical fiber based on results from the measuring range non-inclusion detector and the peak wavelengths detected by the peak wavelength detector.

2. The OFDR device according to claim 1, wherein the measured wavelength range non-inclusion detecting condition data (Ds) further include a peak wavelength change in the plurality of gratings with respect to a strain or temperature change in the measured optical fiber and strain or temperature change ranges that are formed in plural quantities toward a strain or temperature change axis by dividing a strain or temperature change measurable range and are defined by the measured wavelength range and the peak wavelength change in the plurality of gratings, the measuring range non-inclusion detector detects a strain or temperature change range of the plurality of strain or temperature change ranges that includes a strain or temperature of the measured optical fiber from the peak wavelengths detected by the peak wavelength detector based on the measured wavelength range non-inclusion detecting condition data (Ds), and the strain or temperature detector measures a strain distribution or a temperature distribution of the measured optical fiber based on the strain or temperature change range detected by the measuring range non-inclusion detector and the peak wavelengths detected by the peak wavelength detector.

3. The OFDR device according to claim 2, further comprising:

a peak wavelength corrector that determines, when the measuring range non-inclusion detector detects a reflected wavelength of at least one grating of the fiber Bragg grating unit not being included in the measured wavelength range, whether a predetermined measurement processing wavelength to detect a strain or temperature change is included in the peak wavelengths of the gratings of the fiber Bragg grating unit within the measured wavelength range and, if the measurement processing wavelength is not included in the peak wavelengths of the gratings of the fiber Bragg grating unit within the measured wavelength range, converts one or more peak wavelengths of the gratings of the fiber Bragg grating unit within the measured wavelength range into the measurement processing wavelength and outputs the measurement processing wavelength.

4. The OFDR device according to claim 1, wherein the fiber Bragg grating unit of the measured optical fiber includes two gratings that are overlappingly formed, a space between reflected wavelengths of the two gratings being ½ or less of the measured wavelength range, and the measuring range non-inclusion detector detects the number of peak wavelengths detected by the peak wavelength detector, determines that the reflected wavelengths of the two gratings are included in the measured wavelength range if the number of peak wavelengths detected is two, determines that the reflected wavelength of the long wavelength side grating is not included in the measured wavelength range if there is one detected peak wavelength that is on a long wavelength side from the middle of the measured wavelength range, and determines that the reflected wavelength of the short wavelength side grating is not included in the measured wavelength range if there is one detected peak wavelength that is on a short wavelength side from the middle of the measured wavelength range.

5. The OFDR device according to claim 2, wherein the fiber Bragg grating unit of the measured optical fiber includes two gratings that are overlappingly formed, a space between reflected wavelengths of the two gratings being ½ or less of the measured wavelength range, and the measuring range non-inclusion detector detects the number of peak wavelengths detected by the peak wavelength detector, determines that the reflected wavelengths of the two gratings are included in the measured wavelength range if the number of peak wavelengths detected is two, determines that the reflected wavelength of the long wavelength side grating is not included in the measured wavelength range if there is one detected peak wavelength that is on a long wavelength side from the middle of the measured wavelength range, and determines that the reflected wavelength of the short wavelength side grating is not included in the measured wavelength range if there is one detected peak wavelength that is on a short wavelength side from the middle of the measured wavelength range.

6. The OFDR device according to claim 2, wherein the fiber Bragg grating unit of the measured optical fiber includes three or more gratings that are overlappingly formed, spaces between adjacent reflected wavelengths of the three or more gratings being different values, and the measuring range non-inclusion detector estimates gratings of the three or more gratings of which the reflected wavelengths are not included in the measured wavelength range based on one or more spaces between the peak wavelengths detected by the peak wavelength detector.

7. The OFDR device according to claim 2, wherein the fiber Bragg grating unit of the measured optical fiber includes two or more gratings that are overlappingly formed, reflectances of the two or more gratings being different values, and the measuring range non-inclusion detector estimates gratings of the two or more gratings of which the reflected wavelengths are not included in the measured wavelength range based on one or more intensities of the peak wavelengths detected by the peak wavelength detector.

8. The OFDR device according to claim 6, wherein the fiber Bragg grating unit of the measured optical fiber includes n (n≥3) gratings that are overlappingly formed, spaces between adjacent reflected wavelengths of the n gratings being different values, a difference between a longest reflected wavelength and a shortest reflected wavelength of the reflected wavelengths being (n−1)/2 times the measured wavelength range or less, the peak wavelength detector detects peak wavelengths of two gratings of the n gratings, and the measuring range non-inclusion detector estimates gratings of the n gratings of which the reflected wavelengths are not included in the measured wavelength range based on a space between the two peak wavelengths detected.

9. The OFDR device according to claim 7, wherein the fiber Bragg grating unit of the measured optical fiber includes n (n≥2) gratings that are overlappingly formed, reflectances of the n gratings being different values, a difference between a longest reflected wavelength and a shortest reflected wavelength of reflected wavelengths of the n gratings being (n−1) times the measured wavelength range or less, the peak wavelength detector detects a peak wavelength of one grating of the n gratings, and the measuring range non-inclusion detector estimates gratings of the n gratings of which the reflected wavelengths are not included in the measured wavelength range based on the intensity of the peak wavelength detected.

10. The OFDR device according to claim 7, wherein the fiber Bragg grating unit of the measured optical fiber includes n (n≥3) gratings that are overlappingly formed, reflectance differences between gratings of the n gratings of which the reflected wavelengths are adjacent being different values, a difference between a longest reflected wavelength and a shortest reflected wavelength of reflected wavelengths of the n gratings being (n−1)/2 times the measured wavelength range or less, the peak wavelength detector detects peak wavelengths of two gratings of the n gratings, and the measuring range non-inclusion detector estimates gratings of the n gratings of which the reflected wavelengths are not included in the measured wavelength range based on an intensity difference between the two peak wavelengths detected.

11. The OFDR device according to claim 6, wherein the reflected wavelengths of (m+1) (m is an integer, m≥2) or more of the gratings are wavelengths that are either not shifted or shifted by $\Delta\lambda_1$ with respect to equidistant wavelengths of a wavelength space $\Delta\lambda_s$, the reflected wavelengths not being shifted or being shifted by $\Delta\lambda_1$ based on an m-stage pseudorandom binary sequence, the peak wavelength detector detects at least m peak wavelengths, and the measuring range non-inclusion detector detects a pattern of at least m bits by discriminating whether spaces between the adjacent peak wavelengths are $\Delta\lambda_s$, $\Delta\lambda_s+\Delta\lambda_1$, or $\Delta\lambda_s-\Delta\lambda_1$ and estimates gratings of the (m+1) or more gratings of which the reflected wavelengths are not included in the measured wavelength range by obtaining a phase of the pseudorandom binary sequence from the pattern of at least m bits.

12. The OFDR device according to claim 6, wherein each space between the adjacent reflected wavelengths of (m+2) (m is an integer, m≥2) or more of the gratings is either $\Delta\lambda_0$ or $\Delta\lambda_1$, the space being $\Delta\lambda_0$ or $\Delta\lambda_1$ based on an m-stage pseudorandom binary sequence, the peak wavelength detector detects at least (m+1) peak wavelengths, and the measuring range non-inclusion detector detects a pattern of at least m bits by discriminating whether spaces between the adjacent peak wavelengths are $\Delta\lambda_0$ or $\Delta\lambda_1$ and estimates gratings of the (m+2) or more gratings of which the reflected wavelengths are not included in the measured wavelength range by obtaining a phase of the pseudorandom binary sequence from the pattern of at least m bits.

13. The OFDR device according to claim 7, wherein each reflectance of (m+1) (m is an integer, m≥2) or more of the gratings is either R0 or R1, the reflectance being R0 or R1 based on an m-stage pseudorandom binary sequence, the peak wavelength detector detects at least m peak wavelengths, and the measuring range non-inclusion detector detects a pattern of at least m bits from the intensities of the peak wavelengths by discriminating whether the reflectances are R0 or R1 and estimates gratings of the (m+1) or more gratings of which the reflected wavelengths are not included in the measured wavelength range by obtaining a phase of the pseudorandom binary sequence from the pattern of at least m bits.

14. The OFDR device according to claim 7, wherein each reflectance of (m+1) (m is an integer, m≥2) or more of the gratings is either R0 or R1, the reflectance being R0 or R1 based on an m-stage pseudorandom binary sequence, the peak wavelength detector detects at least m peak wavelengths, and the measuring range non-inclusion detector detects a pattern of at least m bits by discriminating whether intensity differences between the adjacent peak wavelengths are zero, R0−R1, or R1−R0 and estimates gratings of the (m+1) or more gratings of which the reflected wavelengths are not included in the measured wavelength range by obtaining a phase of the pseudorandom binary sequence from the pattern of at least m bits.

15. The OFDR device according to claim 7, wherein each reflectance difference between (m+2) (m is an integer, m≥2) or more of the gratings of which the reflected wavelengths are adjacent is either $\Delta R0$ or $\Delta R1$, the reflectance difference being $\Delta R0$ or $\Delta R1$ based on an m-stage pseudorandom binary sequence, the peak wavelength detector detects at least (m+1) peak wavelengths, and the measuring range non-inclusion detector detects a pattern of at least m bits from intensity differences between the adjacent peak wavelengths by discriminating whether the reflectance differences are $\Delta R0$ or $\Delta R1$ and estimates gratings of the (m+2) or more gratings of which the reflected wavelengths are not included in the measured wavelength range by obtaining a phase of the pseudorandom binary sequence from the pattern of at least m bits.

16. An OFDR method for measuring a strain distribution or a temperature distribution of a measured optical fiber in an OFDR device including a light source that outputs wavelength-swept light, a measured optical fiber that includes a fiber Bragg grating unit, an optical splitter/combiner that inputs part of output light from the light source to the measured optical fiber and combines reflected light from the measured optical fiber and part of output light from the light source, an optical receiver that converts light from the optical splitter/combiner into an electrical signal, an A/D converter that converts the electrical signal into a digital signal, a spectrogram calculator that calculates a spectrogram by performing discrete Fourier transform on the digital signal, and a peak wavelength detector that detects one or more peak wavelengths of the spectrogram on a wavelength axis, the method comprising:

a setting step of setting measured wavelength range non-inclusion detecting condition data (Ds) that is based on a predetermined measured wavelength range which is set toward a wavelength axis of the peak wavelengths; and a detecting step of detecting gratings of the plurality of gratings of which the reflected wavelengths are not included in the measured wavelength range based on the measured wavelength range non-inclusion detecting condition data and the detected peak wavelengths output from the peak wavelength detector, wherein the fiber Bragg grating unit includes a plurality of gratings that is overlappingly formed in order to reflect a plurality of different wavelengths, and a strain distribution or a temperature distribution of the measured optical fiber is measured based on detection results from the detecting step and the peak wavelengths detected by the peak wavelength detector.

17. The OFDR method according to claim 16, wherein the measured wavelength range non-inclusion detecting condition data (Ds) is set based on a peak wavelength change in the plurality of gratings with respect to a strain or temperature change in the measured optical fiber and of strain or temperature change ranges that are formed in plural quantities toward a strain or temperature change axis by dividing a strain or temperature change measurable range and are defined by the measured wavelength range and the peak wavelength change in the plurality of gratings, the detecting step further detects a strain or temperature change range of the plurality of strain or temperature change ranges that includes a strain or temperature change in the measured optical fiber from the peak wavelengths detected by the peak wavelength detector based on the measured wavelength range non-inclusion detecting condition data (Ds), and a strain distribution or a temperature distribution of the measured optical fiber is measured based on the strain or temperature change range detected by the detecting step and the peak wavelengths detected by the peak wavelength detector.

18. The OFDR method according to claim 17, further comprising:

a determining step of determining, when the detecting step detects a reflected wavelength of at least one grating of the fiber Bragg grating unit not being included in the measured wavelength range, whether a measurement processing wavelength that is preset to detect a strain or temperature change is included in the peak wavelengths of the gratings of the fiber Bragg grating unit within the measured wavelength range; and a peak wavelength correcting step of converting one or more peak wavelengths of the gratings of the fiber Bragg grating unit within the measured wavelength range into the measurement processing wavelength and outputting the measurement processing wavelength when the measurement processing wavelength is determined not to be included in the peak wavelengths of the gratings of the fiber Bragg grating unit within the measured wavelength range.

19. The OFDR method according to claim 17, wherein the fiber Bragg grating unit of the measured optical fiber includes three or more gratings that are overlappingly formed, spaces between adjacent reflected wavelengths of the three or more gratings being set to different values, and the detecting step estimates gratings of the three or more gratings of which the reflected wavelengths are not included in the measured wavelength range based on one or more spaces between the peak wavelengths detected by the peak wavelength detector.

20. The OFDR method according to claim 17, wherein the fiber Bragg grating unit of the measured optical fiber includes two or more gratings that are overlappingly formed, reflectances of the two or more gratings being set to different values, and the detecting step estimates gratings of the two or more gratings of which the reflected wavelengths are not included in the measured wavelength range based on one or more intensities of the peak wavelengths detected by the peak wavelength detector.

* * * * *